(12) United States Patent
Fujii et al.

(10) Patent No.: US 11,683,084 B2
(45) Date of Patent: Jun. 20, 2023

(54) REVERSE-LINK INTERFERENCE CANCELING IN HAPS MULTI-FEEDER LINK

(71) Applicant: HAPSMobile Inc., Tokyo (JP)

(72) Inventors: Takafumi Fujii, Tokyo (JP); Teruya Fujii, Tokyo (JP)

(73) Assignee: HAPSMobile Inc., Tokyo (JP)

( * ) Notice: Subject to any disclaimer, the term of this patent is extended or adjusted under 35 U.S.C. 154(b) by 0 days.

(21) Appl. No.: 17/625,118

(22) PCT Filed: Mar. 18, 2020

(86) PCT No.: PCT/JP2020/012041
§ 371 (c)(1),
(2) Date: Jan. 6, 2022

(87) PCT Pub. No.: WO2021/038936
PCT Pub. Date: Mar. 4, 2021

(65) Prior Publication Data
US 2022/0376771 A1 Nov. 24, 2022

(30) Foreign Application Priority Data
Aug. 26, 2019 (JP) .............................. JP2019-154107

(51) Int. Cl.
*H04B 7/185* (2006.01)
(52) U.S. Cl.
CPC ..... *H04B 7/18504* (2013.01); *H04B 7/18513* (2013.01)
(58) Field of Classification Search
CPC ............ H04B 7/18504; H04B 7/18513; H04B 7/185; H04B 7/18506; H04B 10/118;
(Continued)

(56) References Cited

U.S. PATENT DOCUMENTS

2006/0276129 A1 12/2006 Karabinis
2016/0046387 A1 2/2016 Frolov et al.

FOREIGN PATENT DOCUMENTS

JP 2007-295569 A 11/2007
JP 2008-502210 A 1/2008
WO WO 2018/075962 A1 4/2018

OTHER PUBLICATIONS

"A Study on Efficient Spectrum Utilization for Feeder Link Using Multiple Gateways in HAPS System", Takafumi Fujii, et al., RCS 2018-203, : 2018, pp. 143-148, reporduced 1-29 (Year: 2018).*
(Continued)

*Primary Examiner* — Khalid W Shaheed
(74) *Attorney, Agent, or Firm* — Muirhead and Saturnelli, LLC

(57) ABSTRACT

It is dynamically suppressed of a downlink interference in a reverse link of a multi-feeder link of a same frequency between an aerial-staying type communication relay apparatus and plural gateway (GW) stations. A relay communication station of the communication relay apparatus estimates plural propagation path responses respectively between plural GW stations and an antenna for feeder link of the communication relay apparatus based on reception results of plural pilot signals received from each of plural GW stations. The relay communication station calculates a weight for suppressing an interference signal that causes an interference by a transmission signal transmitted from a relay communication station to the GW station and received by another GW station, based on the plural propagation path responses, with respect to each of the plural GW stations. The relay communication station adds or subtracts, for the transmission signal to be transmitted to the GW station, a transmission signal to be transmitted to another gateway station that is multiplied by the weight corresponding to the
(Continued)

other gateway station, with respect to each of the plural GW stations.

9 Claims, 16 Drawing Sheets

(58) Field of Classification Search
CPC .............. H04B 7/1851; H04B 7/18521; H04B 7/18517; H04B 7/024; H04B 7/18515; H04W 84/06; H04W 88/16
See application file for complete search history.

(56) References Cited

OTHER PUBLICATIONS

Takafumi Fujii, et al., "A Study on Efficient Spectrum Utilization for Feeder Link using Multiple Gateways HAPS System," The Institute of Electronics Information and Communication Engineers, IEICE Technical Report, RCS2018-203, Nov. 2018.
Takafumi Fujii, et al., "A Study on Interference Reduction for Feeder Link in Multiple Gateways HAPS System," B-5-23, Mar. 19, 2019.

* cited by examiner $$\text{RECEPTION SIGNAL} \begin{bmatrix} Y_{d1} \\ Y_{d2} \\ Y_{d3} \end{bmatrix} \propto \begin{bmatrix} S_{d1} \\ S_{d2} \\ S_{d3} \end{bmatrix} \text{TRANSMISSION SIGNAL}$$

REVERSE-LINK INTERFERENCE CANCELING IN HAPS MULTI-FEEDER LINK

TECHNICAL FIELD

The present invention relates to a reverse-link interference canceling in a multi-feeder link of an aerial-floating type radio relay apparatus such as a HAPS suitable for constructing a three-dimensional network.

BACKGROUND ART

There is conventionally known a communication relay apparatus such as a high altitude platform station (HAPS) (also referred to as "high altitude pseudo satellite") that can float and stay in an airspace (for example, see Patent Literature 1). A communication line in this aerial-floating type communication relay apparatus is configured with a feeder link between the communication relay apparatus and a gateway (GW) station on a mobile communication network side, and a service link between the communication relay apparatus and a terminal apparatus.

CITATION LIST

Patent Literature

Patent Literature 1: U.S. Patent Application Publication No. 2016/0046387.

SUMMARY OF INVENTION

Technical Problem

Since a communication capacity of the service link of the aerial-floating type communication relay apparatus (hereinafter referred to as "upper-air relay apparatus") depends on a communication capacity of a feeder link of a relay frequency, an effective use of the frequency of feeder link is essential. Therefore, it is considered of a method in which plural GW stations on the ground are disposed at locations separated from each other to form a multi-feeder link that transmits and receives different feeder link signals on the same frequency from each GW station. However, unlike the fixed station, the upper-air relay apparatus flies around in a predetermined airspace, so that a dynamic downlink interference may occur in a reverse link of the multi-feeder link of the same frequency between the upper-air relay apparatus and the plural GW stations.

Solution to Problem

A system according to an aspect of the present invention is a system comprising an aerial-staying type communication relay apparatus including a relay communication station that relays a radio communication of a terminal apparatus. The system comprises plural gateway stations that are time-synchronized with each other and transmit and receive relay signals different from each other on a same frequency in a feeder link to and from the relay communication station of the aerial-staying type communication relay apparatus. The relay communication station comprises a feeder-link communication section that transmits and receives relay signals different from each other on a same frequency in the feeder link to and from the plural gateway stations, and an interference suppression section that suppresses an interference between plural feeder links formed with the plural gateway stations. The feeder-link communication section of the relay communication station transmits plural pilot signals having frequencies different from each other to each of the plural gateway stations. Each of the plural gateway stations receives the plural pilot signals transmitted from the relay communication station. Any one gateway station of the plural gateway stations or a common apparatus common to each gateway station estimates plural propagation path responses between the gateway station and an antenna for feeder link of the communication relay apparatus in a transmission signal band of the feeder link based on reception results of the plural pilot signals, and transmits estimation results of the propagation path responses to the relay communication station. The feeder-link communication section of the relay communication station receives the plural propagation path responses transmitted from the any one gateway station or the common apparatus. The interference suppression section of the relay communication station calculates a weight for suppressing an interference signal that causes an interference by a transmission signal transmitted from the relay communication station to the gateway station and received by another gateway station and interferes, based on the plural propagation path responses, with respect to each of the plural gateway stations, and adds or subtracts, for the transmission signal to be transmitted to the gateway station, a transmission signal to be transmitted to another gateway station that is multiplied by the weight corresponding to the other gateway station, with respect to each of the plural gateway stations.

In the foregoing system, each of the plural gateway stations may receive the plural pilot signals transmitted from the relay communication station, and separate each of the received plural pilot signals with a filter, may divide the transmission signal band of the feeder link into plural divided bands and estimate a propagation path response between the gateway station and the antenna for feeder link of the communication relay apparatus in the transmission signal band of the feeder link for each of the plural divided bands, with a center frequency of each of the plural divided bands as an estimated frequency, based on the reception result of the pilot signal received from the relay communication station and separated, and may transmit the estimation result of the propagation path response of each of the plural divided bands to the relay communication station, the feeder-link communication section of the relay communication station may receive the estimation result of the propagation path response of each of the plural divided bands transmitted from each of the plural gateway stations, and the interference suppression section of the relay communication station may calculate a weight for suppressing an interference signal that causes an interference by a transmission signal transmitted from the relay communication station to the gateway station and received by another gateway station, based on the propagation path response of each of the plural divided bands received from each of the plural gateway stations, for each of the divided bands with respect to each of the plural gateway stations, and may generate a divided transmission signal by adding or subtracting, for the transmission signal to be transmitted to the gateway station, a transmission signal to be transmitted to another gateway station that is multiplied by the weight corresponding to the other gateway station, for each of the divided bands with respect to each of the plural gateway stations, and may generate a transmission signal by synthesizing the divided transmission signals of the plural divided bands.

The system according to another aspect of the present invention is a system comprising an aerial-staying type communication relay apparatus including a relay communication station that relays a radio communication of a terminal apparatus. The system comprises plural gateway stations that are time-synchronized with each other and transmit and receive relay signals different from each other on a same frequency in a feeder link to and from the relay communication station of the aerial-staying type communication relay apparatus. The relay communication station comprises a feeder-link communication section that transmits and receives relay signals different from each other on a same frequency in the feeder link to and from the plural gateway stations, and an interference suppression section that suppresses an interference between plural feeder links formed with the plural gateway stations. The feeder-link communication section of the relay communication station transmits plural pilot signals having frequencies different from each other to each of the plural gateway stations. Each of the plural gateway stations receives the plural pilot signals transmitted from the relay communication station, and transmits reception results of the plural pilot signals to the relay communication station. The feeder-link communication section of the relay communication station receives the reception results of the plural pilot signals transmitted from each of the plural gateway stations. The interference suppression section of the relay communication station estimates plural propagation path responses between the gateway station and an antenna for feeder link of the communication relay apparatus in the transmission signal band of the feeder link, based on the reception results of the plural pilot signals received from each of the plural gateway stations, calculates a weight for suppressing an interference signal that causes an interference by a transmission signal transmitted from the relay communication station to the gateway station and received by another gateway station, based on the estimation results of the plural propagation path responses, with respect to each of the plural gateway station, and adds or subtracts, for the transmission signal to be transmitted to the gateway station, a transmission signal to be transmitted to another gateway station that is multiplied by the weight corresponding to the other gateway station, with respect to each of the plural gateway station.

In the foregoing system, each of the plural gateway stations may receive the plural pilot signals transmitted from the relay communication station, and transmits the received plural pilot signals respectively to the relay communication station by separating with a filter, the feeder-link communication section of the relay communication station may receive reception results of the plural separated pilot signals, the interference suppression section of the relay communication station may divide the transmission signal band of the feeder link into plural divided bands, and estimate the propagation path response between the gateway station and an antenna for feeder link of the communication relay apparatus in the transmission signal band of the feeder link for each of the plural divided bands, with a center frequency of each of the plural divided bands as an estimated frequency, based on the reception result of the separated pilot signal, calculate a weight for suppressing an interference signal that causes an interference by a transmission signal transmitted from the relay communication station to the gateway station and received by another gateway station, based on the propagation path response of each of the plural divided bands, for each of the divided bands with respect to each of the plural gateway stations, and may generate a divided transmission signal by adding or subtracting, for the transmission signal to be transmitted to the gateway station, a transmission signal to be transmitted to another gateway station that is multiplied by the weight corresponding to the other gateway station, for each of the divided bands with respect to each of the plural gateway stations, and may generate a transmission signal by synthesizing the divided transmission signals of the plural divided bands.

The system according to yet another aspect of the present invention is a system comprising an aerial-staying type communication relay apparatus including a relay communication station that relays a radio communication of a terminal apparatus. The system comprises plural gateway stations that are time-synchronized with each other and transmit and receive relay signals different from each other on a same frequency in the feeder link to and from the relay communication station of the aerial-staying type communication relay apparatus. The relay communication station comprises a feeder-link communication section that transmits and receives relay signals different from each other on a same frequency in a feeder link to and from the plural gateway stations, and an interference suppression section that suppresses an interference between plural feeder links formed with the plural gateway stations. The feeder-link communication section of the relay communication station transmits plural pilot signals having frequencies different from each other to each of the plural gateway stations. Each of the plural gateway stations receives the plural pilot signals transmitted from the relay communication station. Any one gateway station of the plural gateway stations or a common apparatus common to each gateway station estimates plural propagation path responses between the gateway station and an antenna for feeder link of the communication relay apparatus in a transmission signal band of the feeder link based on reception results of the plural pilot signals, calculates, for each of the plural gateway stations, a weight for suppressing an interference signal that causes an interference by a transmission signal transmitted from the relay communication station to the gateway station and received by another gateway station, based on the estimation results of the plural propagation path responses, with respect to each of the plural gateway station, and transmits calculation results of the weight to the relay communication station. The feeder-link communication section of the relay communication station receives the calculation results of the plural weights transmitted from the any one gateway station or the common apparatus. The interference suppression section of the relay communication station adds or subtracts, for the transmission signal to be transmitted to the gateway station, a transmission signal to be transmitted to another gateway station that is multiplied by the weight corresponding to the other gateway station, with respect to each of the plural gateway station.

In the foregoing system, each of the plural gateway stations may receive the plural pilot signals transmitted from the relay communication station, and separate each of the plural received pilot signals with a filter, the any one gateway station or the common apparatus may divide the transmission signal band of the feeder link into plural divided bands, and may estimate the propagation path response between the gateway station and the antenna for feeder link of the communication relay apparatus in the transmission signal band of the feeder link, for each of the plural divided bands, with a center frequency of each of the plural divided bands as an estimated frequency, based on the reception result of the separated pilot signal, may calculate a weight for suppressing an interference signal that causes an interference by the transmission signal transmitted from the relay communication station to the gateway station and received by another gateway station, based on the propagation path response of each of the plural divided bands, for each of the divided bands with respect to each of the plural gateway stations, and may transmit calculation results of the plural weights to the relay communication station, the feeder-link communication section of the relay communication station may receive the calculation results of the plural weights transmitted from the any one gateway station or the common apparatus, and the interference suppression section of the relay communication station may generate a divided transmission signal by adding or subtracting, for the transmission signal to be transmitted to the gateway station, a transmission signal to be transmitted to another gateway station that is multiplied by the weight corresponding to the other gateway station, for each of the divided bands with respect to each of the plural gateway stations, and may generate a transmission signal by synthesizing the divided transmission signals of the plural divided bands.

A system according to yet another aspect of the present invention is a system comprising an aerial-staying type communication relay apparatus including a relay communication station that relays a radio communication of a terminal apparatus. The system comprises plural gateway stations that are time-synchronized with each other and transmit and receive relay signals different from each other on a same frequency in a feeder link to and from the relay communication station of the aerial-staying type communication relay apparatus. The relay communication station comprises a feeder-link communication section that transmits and receives relay signals different from each other on the same frequency in the feeder link to and from the plural gateway stations, and an interference suppression section that suppresses an interference between plural feeder links formed with the plural gateway stations. The feeder-link communication section of the relay communication station transmits plural pilot signals having frequencies different from each other, to the relay communication station. The feeder-link communication section of the relay communication station receives the plural pilot signals transmitted from each of the plural gateway stations. The interference suppression section of the relay communication station estimates plural propagation path responses respectively between the plural gateway stations and an antenna for feeder link of the communication relay apparatus in a transmission signal band of the feeder link, based on reception results of the plural pilot signals received from each of the plural gateway stations, calculates a weight for suppressing an interference signal that causes an interference by the transmission signal transmitted from the relay communication station to the gateway station and received by another gateway station, based on the plural propagation path responses, with respect to each of the plural gateway station, and adds or subtracts, for the transmission signal to be transmitted to the gateway station, a transmission signal to be transmitted to another gateway station that is multiplied by the weight corresponding to the other gateway station, with respect to each of the plural gateway station.

In the foregoing system, the feeder-link communication section of the relay communication station may receive plural pilot signals having frequencies different from each other transmitted from each of the plural gateway stations, and separate each of the received plural pilot signals with a filter, and the interference suppression section of the relay communication station may divide the transmission signal band of the feeder link into plural divided bands, and may estimate the propagation path response respectively between the plural gateway stations and the antenna for feeder link of the communication relay apparatus in the transmission signal band of the feeder link, for each of the plural divided bands, with a center frequency of each of the plural divided bands as an estimated frequency, based on the reception results of the plural pilot signals received from each of the plural gateway stations and separated, calculate a weight for suppressing an interference signal that causes an interference by a transmission signal transmitted from the relay communication station to the gateway station and received by another gateway station, based on the propagation path response of each of the plural divided bands, for each of the divided bands with respect to each of the plural gateway stations, and may generate a divided transmission signal by adding or subtracting, for the transmission signal to be transmitted to the gateway station, a transmission signal to be transmitted to another gateway station that is multiplied by the weight corresponding to the other gateway station, for each of the divided bands with respect to each of the plural gateway stations, and may generate a transmission signal by synthesizing the divided transmission signals of the plural divided bands.

A system according to yet another aspect of the present invention is a system comprising an aerial-staying type communication relay apparatus including a relay communication station that relays a radio communication of a terminal apparatus. The system comprises plural gateway stations that are time-synchronized with each other and transmit and receive relay signals different from each other on a same frequency in a feeder link to and from the relay communication station of the aerial-staying type communication relay apparatus. The relay communication station transmits plural pilot signals having frequencies different from each other, to each of the plural gateway stations. Each of the plural gateway stations receives the plural pilot signals transmitted from the relay communication station, estimates plural propagation path responses between the gateway station and an antenna for feeder link of the communication relay apparatus in a transmission signal band of the feeder link based on reception results of the plural pilot signals, calculates a weight for suppressing an interference signal that causes an interference by a transmission signal transmitted from the relay communication station to the gateway station and received by another gateway station, based on the plural propagation path responses, and adds or subtracts, for a reception signal received by the gateway station, a reception signal received by the other gateway station that is multiplied by the weight corresponding to the other gateway station.

In the foregoing system, each of the plural gateway stations may receive the plural pilot signals transmitted from the relay communication station and separates each of the received plural pilot signals with a filter, may divide the transmission signal band of the feeder link into plural divided bands, and may estimate plural propagation path responses respectively between the gateway stations and the antenna for feeder link of the communication relay apparatus in the transmission signal band of the feeder link, for each of the plural divided bands, with a center frequency of each of the plural divided bands as an estimated frequency, based on the reception result of the pilot signal received from the relay communication station and separated, may calculates a weight for suppressing an interference signal that causes an interference by a transmission signal transmitted from the relay communication station to the gateway station and received by another gateway station, based on the propagation path response of each of the plural divided bands, for each of the divided bands, may generates a divided reception signal by adding or subtracting, for the reception signal received by the gateway station, a reception signal received by another gateway station that is multiplied by the weight corresponding to the other gateway station, for each of the divided bands, and may generate a reception signal by synthesizing the divided reception signals of the plural divided bands.

A relay communication station according to yet another aspect of the present invention is a relay communication station that is incorporated in an aerial-staying type communication relay apparatus and relays a radio communication of a terminal apparatus. The relay communication station comprises a feeder-link communication section that transmits and receives relay signals different from each other on a same frequency in a feeder link to and from plural gateway stations that are time-synchronized with each other, and an interference suppression section that suppresses an interference between plural feeder links formed with the plural gateway stations. The feeder-link communication section transmits plural pilot signals having frequencies different from each other, to each of the plural gateway stations, and receives estimation results of plural propagation path responses between the gateway stations and an antenna for feeder link of the communication relay apparatus in a transmission signal band of the feeder link, wherein the plural propagation path responses are estimated by any one gateway station of the plural gateway stations or a common apparatus common to each gateway station based on reception results of the plural pilot signals. The interference suppression section calculates a weight for suppressing an interference signal that causes an interference by a transmission signal transmitted from the relay communication station to the gateway station and received by another gateway station, based on the plural propagation path responses received from the any one gateway stations or the common apparatus, with respect to each of the plural gateway station, and adds or subtracts, for the transmission signal to be transmitted to the gateway station, a transmission signal to be transmitted to another gateway station that is multiplied by the weight corresponding to the other gateway station, with respect to each of the plural gateway station.

A relay communication station according to yet another aspect of the present invention is a relay communication station that is incorporated in an aerial-staying type communication relay apparatus and relays a radio communication of a terminal apparatus. The relay communication station comprises a feeder-link communication section that transmits and receives relay signals different from each other on a same frequency in a feeder link to and from plural gateway stations that are time-synchronized with each other, and an interference suppression section that suppresses an interference between plural feeder links formed with the plural gateway stations. The feeder-link communication section transmits plural pilot signals having frequencies different from each other to each of the plural gateway stations, and receives reception results of the plural pilot signals received by each of the plural gateway stations. The interference suppression section estimates plural propagation path responses between the gateway station and an antenna for feeder link of the communication relay apparatus in a transmission signal band of the feeder link, based on the reception results of the plural pilot signals received from each of the plural gateway stations, calculates a weight for suppressing an interference signal that causes an interference by a transmission signal transmitted from the relay communication station to the gateway station and received by another gateway station, based on estimation results of the plural propagation path responses, with respect to each of the plural gateway station, and adds or subtracts, for the transmission signal transmitted to the gateway station, a transmission signal to be transmitted to another gateway station that is multiplied by the weight corresponding to the other gateway station, with respect to each of the plural gateway station.

A relay communication station according to yet another aspect of the present invention is a relay communication station that is incorporated in an aerial-staying type communication relay apparatus and relays a radio communication of a terminal apparatus. The relay communication station comprises a feeder-link communication section that transmits and receives relay signals different from each other on a same frequency in a feeder link to and from plural gateway stations that are time-synchronized with each other, and an interference suppression section that suppresses an interference between plural feeder links formed with the plural gateway stations. The feeder-link communication section transmits plural pilot signals having frequencies different from each other to each of the plural gateway stations, and receives a calculation result of a weight for suppressing an interference signal that causes an interference by a transmission signal transmitted from the relay communication station to the gateway station and received by another gateway station, wherein the weight is calculated by any one gateway station of the plural gateway stations or a common apparatus common to each gateway station for each of the plural gateway stations based on reception results of the plural pilot signals, and the interference suppression section adds or subtracts, for the transmission signal to be transmitted to the gateway station, a transmission signal to be transmitted to another gateway station that is multiplied by the weight corresponding to the other gateway station, with respect to each of the plural gateway stations.

A relay communication station according to yet another aspect of the present invention is a relay communication station that is incorporated in an aerial-staying type communication relay apparatus and relays a radio communication of a terminal apparatus. The relay communication station comprises a feeder-link communication section that transmits and receives relay signals different from each other on a same frequency in a feeder link to and from plural gateway stations that are time-synchronized with each other, and an interference suppression section that suppresses an interference between plural feeder links formed with the plural gateway stations. The feeder-link communication section receives the plural pilot signals transmitted from each of the plural gateway stations. The interference suppression section estimates plural propagation path responses respectively between the plural gateway stations and an antenna for feeder link of the communication relay apparatus in a transmission signal band of the feeder link based on reception results of the plural pilot signals received from each of the plural gateway stations, calculates a weight for suppressing an interference signal that causes an interference by a transmission signal transmitted from the relay communication station to the gateway station and received by another gateway station, based on the plural propagation path responses, with respect to each of the plural gateway station, and adds or subtracts, for the transmission signal to be transmitted to the gateway station, a transmission signal to be transmitted to another gateway station that is multiplied by the weight corresponding to the other gateway station, with respect to each of the plural gateway station.

An aerial-staying type communication relay apparatus according to yet another aspect of the present invention comprises any of the above-mentioned relay communication stations.

A gateway station according to yet another aspect of the present invention is a gateway station that is incorporated in an aerial-staying type communication relay apparatus and transmits and receives relay signals different from each other on a same frequency in a feeder link to and from a relay communication station that relays a radio communication of a terminal apparatus. The gateway station is time-synchronized with another gateway station that transmits and receives relay signals on the same frequency in the feeder link to and from the relay communication station, receives plural pilot signals having frequencies different from each other which are transmitted from the relay communication station, receives reception results of the plural pilot signals having frequencies different from each other, wherein the plural pilot signals are transmitted from the relay communication station and received by the other gateway station, from the other gateway station, estimates plural propagation path responses between the own gateway station and the other gateway station and an antenna for feeder link of the communication relay apparatus in a transmission signal band of the feeder link, based on the reception results of the plural pilot signals received by the own station and the other gateway station, and transmits estimation results of the propagation path responses to the relay communication station.

A gateway station according to yet another aspect of the present invention is a gateway station that is incorporated in an aerial-staying type communication relay apparatus and transmits and receives relay signals different from each other on a same frequency in a feeder link to and from a relay communication station that relays a radio communication of a terminal apparatus. The gateway station is time-synchronized with another gateway station that transmits and receives relay signals on the same frequency in the feeder link to and from the relay communication station, receives plural pilot signals having frequencies different from each other transmitted from the relay communication station, receives reception results of the plural pilot signals having frequencies different from each other transmitted from the relay communication station, from the other gateway station, estimates plural propagation path responses between the own gateway station and the other gateway station and an antenna for feeder link of the communication relay apparatus in a transmission signal band of the feeder link, based on the reception results of the plural pilot signals received by the own gateway station and the other gateway station, and calculates a weight for suppressing an interference signal that causes an interference by a transmission signal transmitted from the relay communication station to the gateway station and received by another gateway station, based on estimation results of the plural propagation path responses, with respect to each of the plural gateway stations.

A gateway station according to yet another aspect of the present invention is a gateway station that is incorporated in an aerial-staying type communication relay apparatus and transmits and receives relay signals different from each other on a same frequency in a feeder link to and from a relay communication station that relays a radio communication of a terminal apparatus. The gateway station is time-synchronized with another gateway station that transmits and receives relay signals on the same frequency in the feeder link to and from the relay communication station, receives plural pilot signals having frequencies different from each other transmitted from the relay communication station, receives reception results of the plural pilot signals having frequencies different from each other transmitted from the relay communication station, from the other gateway station, estimates plural propagation path responses between the gateway station and an antenna for feeder link of the communication relay apparatus in a transmission signal band of the feeder link, based on the reception results of the plural pilot signals received by the own gateway station and the other gateway station, calculates a weight for suppressing an interference signal that causes an interference by a transmission signal transmitted from the relay communication station to the gateway station and received by another gateway station, based on the plural propagation path responses, and adds or subtracts, for the reception signal received by the gateway station, a reception signal received by the other gateway station that is multiplied by the weight corresponding to the other gateway station.

An interference suppression method according to yet another aspect of the present invention is an interference suppression method of feeder link in a relay communication station that is incorporated in an aerial-staying type communication relay apparatus and relays a radio communication of a terminal apparatus. The interference suppression method comprises transmitting plural pilot signals having frequencies different from each other, to each of plural gateway stations that are time-synchronized with each other, receiving estimation results of plural propagation path responses between the gateway station and an antenna for feeder link of the communication relay apparatus in a transmission signal band of the feeder link which are estimated by any one gateway station of the plural gateway stations or a common apparatus common to each gateway station, based on reception results of the plural pilot signals received by each of the plural gateway stations, calculating a weight for suppressing an interference signal that causes an interference by a transmission signal transmitted from the relay communication station to the gateway station and received by another gateway station, based on the plural propagation path responses received from the any one gateway station or the common apparatus, and adding or subtracting, for the transmission signal to be transmitted to the gateway station, a transmission signal to be transmitted to another gateway station that is multiplied by the weight corresponding to the other gateway station, with respect to each of the plural gateway stations.

An interference suppression method according to yet another aspect of the present invention is an interference suppression method of feeder link in a relay communication station that is incorporated in an aerial-staying type communication relay apparatus and relays a radio communication of a terminal apparatus. The interference suppression method comprises transmitting plural pilot signals having frequencies different from each other, to each of plural gateway stations that are time-synchronized with each other, receiving reception results of the plural pilot signals received by each of the plural gateway stations, estimating plural propagation path responses between the gateway station and an antenna for feeder link of the communication relay apparatus in a transmission signal band of the feeder link, based on the reception results of the plural pilot signals, calculating a weight for suppressing an interference signal that causes an interference by a transmission signal transmitted from the relay communication station to the gateway station and received by another gateway station, based on estimation results of the plural propagation path responses, and adding or subtracting, for the transmission signal to be transmitted to the gateway station, a transmission signal to be transmitted to another gateway station that is multiplied by the weight corresponding to the other gateway station, with respect to each of the plural gateway station.

An interference suppression method according to yet another aspect of the present invention is an interference suppression method of feeder link in a relay communication station that is incorporated in an aerial-staying type communication relay apparatus and relays a radio communication of a terminal apparatus. The interference suppression method comprises transmitting plural pilot signals having frequencies different from each other, to each of plural gateway stations that are time-synchronized with each other, receiving a calculation result of a weight for suppressing an interference signal that causes an interference by a transmission signal transmitted from the relay communication station to the gateway station and received by another gateway station, wherein the calculation result is calculated by any one gateway station of the plural gateway stations or a common apparatus common to each gateway station for each of the plural gateway stations based on reception results of the plural pilot signals, and adding or subtracting, for the transmission signal to be transmitted to the gateway station, a transmission signal to be transmitted to another gateway station that is multiplied by the weight corresponding to the other gateway station, with respect to each of the plural gateway station.

An interference suppression method according to yet another aspect of the present invention is an interference suppression method of feeder link in a relay communication station that is incorporated in an aerial-staying type communication relay apparatus and relays a radio communication of a terminal apparatus. The interference suppression method comprises receiving plural pilot signals having frequencies different from each other transmitted from each of plural gateway stations that are time-synchronized with each other, estimating plural propagation path responses respectively between the plural gateway stations and an antenna for feeder link of the communication relay apparatus, based on reception results of the plural pilot signals received from each of the plural gateway stations, calculating a weight for suppressing an interference signal that causes an interference by a transmission signal transmitted from the relay communication station to the gateway station and received by another gateway station, based on the plural propagation path responses, with respect to each of the plural gateway station, and adding or subtracting, for the transmission signal to be transmitted to the gateway station, a transmission signal to be transmitted to another gateway station that is multiplied by the weight corresponding to the other gateway station, with respect to each of the plural gateway station.

An interference suppression method according to yet another aspect of the present invention is an interference suppression method of feeder link in a relay communication station that is incorporated in an aerial-staying type communication relay apparatus and relays a radio communication of a terminal apparatus. The interference suppression method comprises time-synchronizing with another gateway station that transmits and receives relay signals on the same frequency in the feeder link to and from the relay communication station, receiving plural pilot signals having frequencies different from each other transmitted from the relay communication station, receiving reception results of the plural pilot signals having frequencies different from each other which are transmitted from the relay communication station, from the other gateway station, estimating plural propagation path responses between the gateway station and an antenna for feeder link of the communication relay apparatus in a transmission signal band of the feeder link, based on the reception results of the plural pilot signals received by the own gateway station and the other gateway station, calculating a weight for suppressing an interference signal that causes an interference by a transmission signal transmitted from the relay communication station to the gateway station and received by another gateway station, based on the plural propagation path responses, and adding or subtracting, for the reception signal received by the gateway station, a reception signal received by the other gateway station that is multiplied by the weight corresponding to the other gateway station.

A program according to yet another aspect of the present invention is a program executed by a computer or a processor installed in a relay communication station that is incorporated in an aerial-staying type communication relay apparatus and relays a radio communication of a terminal apparatus. The program comprises a program code for transmitting plural pilot signals having frequencies different from each other to each of plural gateway stations that are time-synchronized with each other, a program code for receiving estimation results of plural propagation path responses between the gateway station and an antenna for feeder link of the communication relay apparatus in a transmission signal band of the feeder link which are estimated by the any one gateway station of the plural gateway stations or a common apparatus common to each gateway station, based on reception results of the plural pilot signals received by each of the plural gateway stations, a program code for calculating a weight for suppressing an interference signal that causes an interference by a transmission signal transmitted from the relay communication station to the gateway station and received by another gateway station, based on the plural propagation path responses received from the any one gateway station or the common apparatus, with respect to each of the plural gateway stations, and a program code for adding or subtracting, for the transmission signal to be transmitted to the gateway station, a transmission signal to be transmitted to another gateway station that is multiplied by the weight corresponding to the other gateway station, with respect to each of the plural gateway stations.

A program according to yet another aspect of the present invention is a program executed by a computer or a processor installed in a relay communication station that is incorporated in an aerial-staying type communication relay an apparatus and relays radio communication of a terminal apparatus. The program comprises a program code for transmitting plural pilot signals having frequencies different from each other, to each of plural gateway stations that are time-synchronized with each other, a program code for receiving reception results of the plural pilot signals received by each of the plural gateway stations, a program code for estimating plural propagation path responses between the gateway station and an antenna for feeder link of the communication relay apparatus in a transmission signal band of a feeder link, based on the reception results of the plural pilot signals, a program code for calculating a weight for suppressing an interference signal that causes an interference by a transmission signal transmitted from the relay communication station to the gateway station and received by another gateway station, based on the estimation results of the plural propagation path responses, with respect to each of the plural gateway stations, and a program code for adding or subtracting, for the transmission signal to be transmitted to the gateway station, a transmission signal to be transmitted to another gateway station that is multiplied by the weight corresponding to the other gateway station, with respect to each of the plural gateway stations.

A program according to yet another aspect of the present invention is a program executed by a computer or a processor installed in a relay communication station that is incorporated in an aerial-staying type communication relay apparatus and relays a radio communication of a terminal apparatus. The program comprises a program code for transmitting plural pilot signals having frequencies different from each other, to each of plural gateway stations that are time-synchronized with each other, a program code for receiving a calculation result of a weight for suppressing an interference signal that causes an interference by a transmission signal transmitted from the relay communication station to the gateway station and received by another gateway station and interferes, wherein the calculation result is calculated by any one gateway station of the plural gateway stations or a common apparatus common to each gateway station for each of the plural gateway stations based on reception results of the plural pilot signals, and a program code for adding or subtracting, for the transmission signal to be transmitted to the gateway station, a transmission signal to be transmitted to another gateway station that is multiplied by the weight corresponding to the other gateway station, with respect to each of the plural gateway stations.

A program according to yet another aspect of the present invention is a program executed by a computer or a processor installed in a relay communication station that is incorporated in an aerial-staying type communication relay apparatus and relays a radio communication of a terminal apparatus. The program comprises a program code for receiving plural pilot signals having frequencies different from each other which are transmitted from each of plural gateway stations that are time-synchronized with each other, a program code for estimating plural propagation path responses respectively between the plural gateway stations and an antenna for feeder link of the communication relay apparatus in a transmission signal band of a feeder link, based on reception results of the plural pilot signals received from each of the plural gateway stations, a program code for calculating a weight for suppressing an interference signal that causes an interference by a transmission signal transmitted from the relay communication station to the gateway station and received by another gateway station and interferes, based on the plural propagation path responses, with respect to each of the plural gateway stations, and a program code for adding or subtracting, for the transmission signal to be transmitted to the gateway station, a transmission signal to be transmitted to another gateway station that is multiplied by the weight corresponding to the other gateway station, with respect to each of the plural gateway station.

A program according to yet another aspect of the present invention is a program executed by a computer or a processor installed in a gateway station that transmits and receives relay signals different from each other on a same frequency in a feeder link to and from a relay communication station that is incorporated in an aerial-staying type communication relay apparatus and relays a radio communication of a terminal apparatus. The program comprises a program code for time-synchronizing with another gateway station that transmits and receives relay signals on the same frequency in the feeder link to and from the relay communication station, a program code for receiving plural pilot signals having frequencies different from each other which are transmitted from the relay communication station, a program code for receiving reception results of the plural pilot signals having frequencies different from each other which are transmitted from the relay communication station, from the other gateway station, a program code for estimating plural propagation path responses between the gateway station and an antenna for feeder link of the communication relay apparatus in a transmission signal band of the feeder link, based on the reception results of the plural pilot signals received by the own gateway station and the other gateway station, a program code for calculating a weight for suppressing an interference signal that causes an interference by a transmission signal transmitted from the relay communication station to the gateway station and received by another gateway station, based on the plural propagation path responses, and a program code for adding or subtracting, for the reception signal received by the gateway station, a reception signal received by the other gateway station that is multiplied by the weight corresponding to the other gateway station.

In the foregoing system, the foregoing relay communication station, the foregoing aerial-staying type communication relay apparatus, the foregoing gateway station, the foregoing interference suppression method and the foregoing program, the plural pilot signals may be distributed and transmitted in plural guard bands located on both sides of the transmission signal band of the feeder link.

At the center frequency of the transmission signal band of the feeder link or a frequency around the center frequency, the plural weights may be calculated by estimating the plural propagation path responses.

Each of the plural weights may be calculated by the ZF (Zero-Forcing) method or the MMSE (Minimum Mean Square Error) method using matrix of the propagation path response.

Each of the plural gateway stations may include an antenna control section that controls an antenna for feeder link so as to track the aerial-staying type communication relay apparatus.

The aerial-staying type communication relay apparatus may comprise an antenna for feeder link having plural directional beams that respectively correspond to the plural gateway stations, and an antenna control section for controlling the antenna for feeder link so that each of the plural beams directs toward a corresponding gateway station.

The antenna for feeder link may be plural feeder link antennas having directional beams in different directions from each other, and the antenna control section may mechanically control each of the plural antennas for feeder link so that the directional beams of the plural antennas for feeder link are respectively directed toward the corresponding gateway stations.

The antenna for feeder link may be an array antenna capable of forming the plural directional beams in an arbitrary outward direction centered on a virtual axis in the vertical direction, and the antenna control section may control amplitudes and phases of transmission/reception signals for plural antenna elements of the array antenna so that each of the plural directional beams is directed toward the corresponding gateway station.

The antenna for feeder link may be plural array antennas capable of forming a directional beam in a predetermined angle range centered on different directions from each other, and the antenna control section may selectively perform a control of amplitudes and phases of transmission/reception signals for plural antenna elements of each array antenna and a switching control of the plural array antennas, so that each of the plural directional beams of the plural array antennas is directed toward the corresponding gateway station.

Advantageous Effects of Invention

According to the present invention, it is possible to dynamically suppress a downlink interference in a reverse link of a multi-feeder link of a same frequency between an aerial-floating type communication relay apparatus and plural gateway stations.

DESCRIPTION OF EMBODIMENTS

Hereinafter, embodiments of the present invention are described with reference to the drawings.

Figure 1:
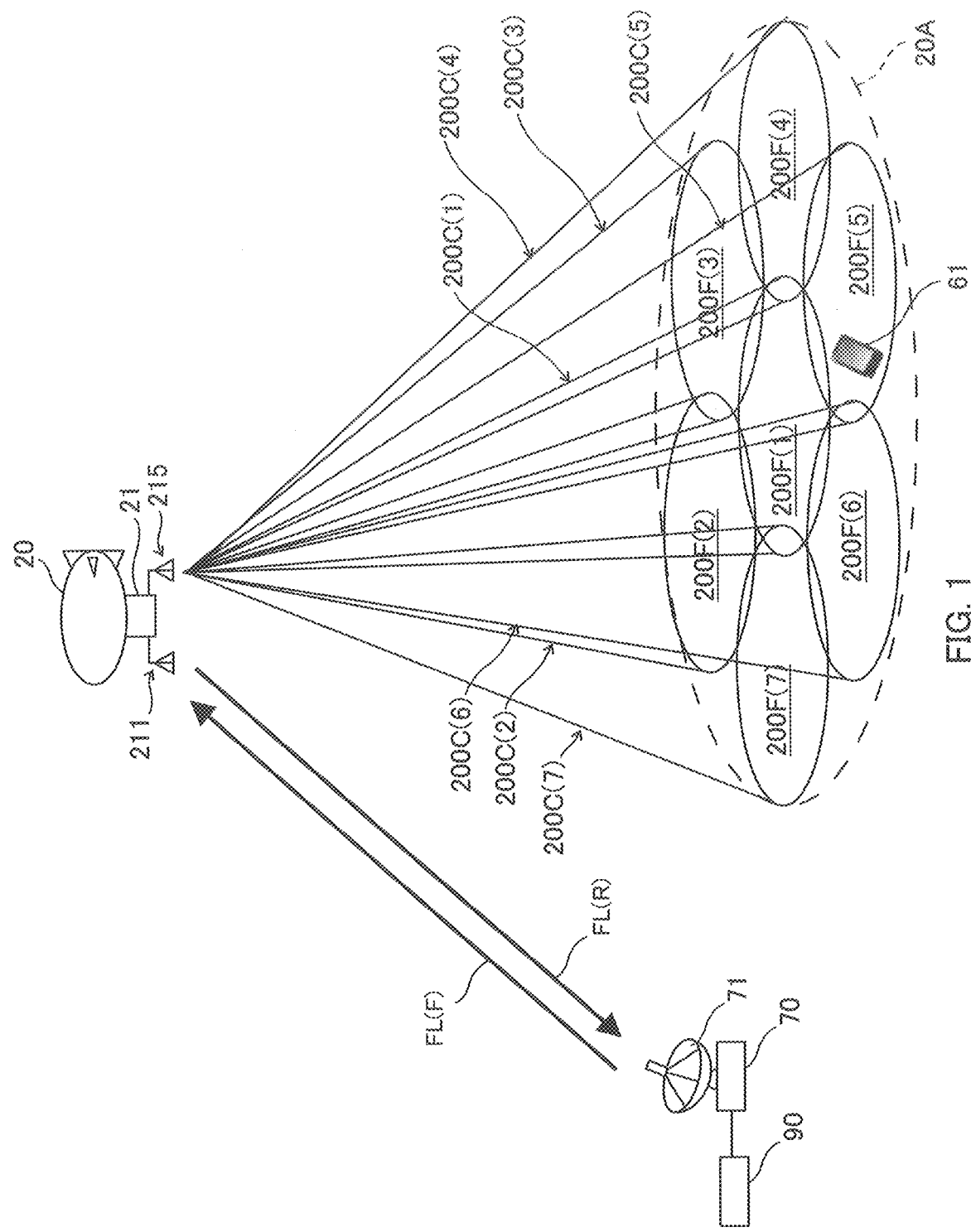
FIG. 1 is an illustration showing an example of a HAPS cell configuration in a communication system according to an embodiment of the present invention.

FIG. 1 is an illustration showing an example of a cell configuration of HAPS 20 in a communication system according to an embodiment of the present invention. The communication system according to the present embodiment is suitable for realizing a three-dimensional network of the fifth-generation or the later generation mobile communication that supports simultaneous connection to a large number of terminal apparatuses, and low delay, etc. The mobile communication standards disclosed in the present specification are applicable to communication systems, radio relay stations, base stations, repeaters and terminal apparatuses include the fifth-generation mobile communication standard and the fifth-generation and subsequent generation mobile communication standards.

As shown in FIG. 1, the communication system is provided with High-Altitude Platform Stations (HAPS) (also called "high altitude pseudo satellite" or "stratified platform") 20 as plural aerial-floating type communication relay apparatuses (radio relay apparatuses). The HAPS 20 is located in an airspace at a predetermined altitude, and forms three-dimensional cell (three-dimensional area) in a cell-formation target airspace at a predetermined altitude. The HAPS 20 is an airship as a floating object that is controlled by autonomous control or external control so as to float or fly and be located in an airspace (floating airspace) with high altitude of 100 [km] or less from the ground level or the sea level, and a relay communication station 21 is mounted on the airship.

The airspace in which the HAPS 20 is located is, for example, a stratospheric airspace with altitude greater than 11 [km] and less than 50 [km] on the ground (or on the water such as the sea or lake). The airspace may be an airspace in an altitude of 15 [km] or more and 25 [km] or less where weather conditions are relatively stable, and may be an airspace with altitude of about 20 [km] in particular.

The cell-formation target airspace, which is a target airspace for forming a three-dimensional cell with one or two or more HAPSs according to the communication system in the present embodiment, is an airspace in a predetermined altitude range (for example, altitude range of 50 [m] or more and 1000 [m] or less) located between the airspace where the HAPS 20 is located and a cell-formation spatial area near the ground level covered by a base station (for example, LTE eNodeB) such as a conventional macro-cell base station.

It is noted that, the cell-formation target airspace where the three-dimensional cell in the present embodiment is formed may be an airspace over the sea, a river or a lake. Further, the three-dimensional cell formed by the HAPS 20 may be formed so as to reach the ground level or the sea level so that it can communicate with a terminal apparatus 61 located on the ground or on the sea.

The relay communication stations of the HAPS 20 respectively form plural beams for wirelessly communicating with the terminal apparatus 61 that is a mobile station, toward the ground by an antenna for service link (hereinafter referred to as "SL antenna") 215. The terminal apparatus 61 may be a communication terminal module incorporated in a drone that is an aircraft such as a small helicopter capable of remotely steering, or may be a user apparatus used by a user in an airplane. An area through which the beam passes in the cell-formation target airspace is a three-dimensional cell. The plural beams adjacent to each other in the cell-formation target airspace may be partially overlapped with each other.

Each of the relay communication stations 21 of the HAPSs 20 is, for example, a base station that wirelessly communicates with a gateway station (also referred to as a "feeder station") 70 as a relay station connected to a core network on the ground (or on the sea) side, or a slave repeater that wirelessly communicates with the feeder station (master repeater) 70 as a relay station connected to a base station on the ground (or on the sea) side.

The relay communication station 21 of the HAPS 20 is connected to a core network of a mobile communication network 80 via the feeder station 70, which is installed on the ground or on the sea, capable of radio communication by an antenna for feeder link (hereinafter referred to as "FL antenna") 211. A communication of feeder link between the HAPS 20 and the feeder station 70 may be performed by a radio communication using a radio wave such as a microwave, or may be performed by an optical communication using a laser light or the like.

Each of the HAPS 20 may autonomously control its own floating movement (flight) and a process in the relay communication station 21 by executing a control program with a control section including a computer or the like incorporated inside of the HAPS. For example, each of the HAPS 20 may acquire its own current position information (for example, GPS position information), position control information (for example, flight schedule information) stored in advance, position information on another HAPS located in a peripheral space or the like, and may autonomously control floating movement (flight) and process in the relay communication station 21 based on these pieces of information.

Further, the floating movement (flight) of each of the HAPS 20 and the process in the relay communication station 21 may be controlled by a management apparatus (also referred to as a "remote control apparatus") as a management apparatus provided in a communication center or the like of the mobile communication network. The management apparatus can be configured with, for example, a computer apparatus such as a PC, a server, or the like. In this case, the HAPS 20 may incorporate a communication terminal apparatus for control (for example, mobile communication module) so that it can receive control information from the management apparatus and transmit various pieces of information such as monitoring information to the management apparatus, and may be assigned terminal identification information (for example, IP address, phone number, etc.) so that it can be identified from the management apparatus. The MAC address of the communication interface may be used to identify the communication terminal apparatus for control.

Moreover, each of the HAPS 20 may transmit information regarding the floating movement (flight) of the own HAPS or a surrounding HAPS and/or the process at the relay communication station 21, and monitoring information such as information on statuses of the HAPS 20 and observation data acquired by various kinds of sensors, to a predetermined destination such as the management apparatus. The control information may include information on target flight route of the HAPS. The monitoring information may include at least one of information on current positions, flight-route history information, velocity relative to the air, velocity relative to the ground and propulsion direction of the HAPS 20, wind velocity and wind direction around the HAPS 20, and atmospheric pressure and temperature around the HAPS 20.

Duplex methods of uplink and downlink for radio communication with the relay communication station 21 and the terminal apparatus 61 are not limited to specific methods, and may be, for example, a time division duplex method (Time Division Duplex: TDD) or a frequency division duplex method (Frequency Division Duplex: FDD). An access method for radio communication with the relay communication station 21 and the terminal apparatus 61 is not limited to the specific method, but may be, for example, FDMA (Frequency Division Multiple Access) method, TDMA (Time Division Multiple Access) method, CDMA (Code Division Multiple Access) method, or OFDMA (Orthogonal Frequency Division Multiple Access). In the foregoing radio communication, a MIMO (Multi-Input and Multi-Output) technology may be used, which has functions of diversity/coding, transmission beam forming, spatial division multiplexing (SDM: Spatial Division Multiplexing), etc., and in which a transmission capacity per unit frequency can be increased by simultaneously using plural antennas for both of transmission and reception. The MIMO technology may be an SU-MIMO (Single-User MIMO) technology in which one base station transmits plural signals to one terminal apparatus on the same time/same frequency, and may be an MU-MIMO (Multi-User MIMO) technology in which one base station transmits signals to plural different communication terminal apparatuses on the same time/same frequency or plural different base stations transmit signals to one terminal apparatus on the same time/same frequency.

It is noted that, in the following embodiments, although it is illustrated and described regarding some cases in which a communication relay apparatus having the relay communication station 21 that wirelessly communicates with the terminal apparatus 61 is an unmanned-airship type HAPS 20, the communication relay apparatus may be a solar-plane type HAPS. Further, the following embodiments can be similarly applied to aerial-floating type communication relay apparatuses other than the HAPS.

A link between the HAPS 20 and a base station 90 via a gateway station (hereinafter abbreviated as "GW station") 70 as a feeder station is referred to as a "feeder link", and a link between the HAPS 10 and the terminal apparatus 61 is referred to as a "service link". In particular, a spatial section between the HAPS 20 and the GW station 70 is referred to as a "radio section of feeder link". Further, a downlink of a communication from the GW station 70 to the terminal apparatus 61 via the HAPS 20 is referred to as a "forward link", and an uplink of a communication from the terminal apparatus 61 to the GW station 70 via the HAPS 20 is also referred to as a "reverse link".

In FIG. 1, although the communication relay apparatus is the unmanned-airship type HAPS 20, it may be a solar-plane type HAPS. Further, in the illustrated example, although the HAPS 20 is located in the stratosphere with an altitude of about 20 km, the HAPS 20 forms plural cells 200C(1) to 200C(7), and a diameter of a service area 20A consisting of footprints 200F(1) to 200F(7) of the cells 200C(1) to 200C(7) of the plural cells (7 cells) configuration is 100 to 200 km, it is not limited to these examples.

In FIG. 1, a communication service that directly communicates with the terminal apparatus 61 on the ground (or on the water) using the HAPS 20 located in the stratosphere is very attractive as an expansion of service area and a communication means in the event of a disaster. The communication line of the HAPS 20 comprises a feeder link FL connecting the GW station 70 and the HAPS 20, and a service link SL connecting the HAPS 20 and the terminal apparatus 61. Since the communication capacity of the service link depends on the communication capacity of the feeder link which is the relay frequency, it is necessary to improve the frequency utilization efficiency of the feeder link. In particular, in case that the service link has a multi-cell configuration as shown in FIG. 1, the communication capacity of the feeder link tends to be insufficient, so that a frequency effective utilization technology for the feeder link is indispensable. However, in case that the HAPS 20 and the GW station 70 are configured one-to-one, it is difficult to improve the frequency utilization efficiency of the feeder link.

Therefore, in the present embodiment, a plural-gateway system (hereinafter also referred to as "plural-GW system") is constructed, which is configured with plural GW stations that transmit and receive relay signals different from each other on a same frequency to and from the HAPS 20 in the feeder links of Frequency Division Duplex (FDD) method, and performs a spatial-division multiplex communication in a multi feeder link formed between one HAPS 20 and plural GW stations. In the plural-GW system, by eliminating interference between the plural feeder links, the frequency utilization efficiency can be improved depending on the number of GW stations to be installed.

It is noted that, in the following embodiments, although it is described regarding some cases in which the spatial-division multiplex communication between the HAPS 20 and the plural GW stations is performed only by a forward link of the feeder link, the spatial-division multiplex communication may be performed only by a reverse link of the feeder link, or may be performed by both of the forward link and the reverse link.

Figure 2B:
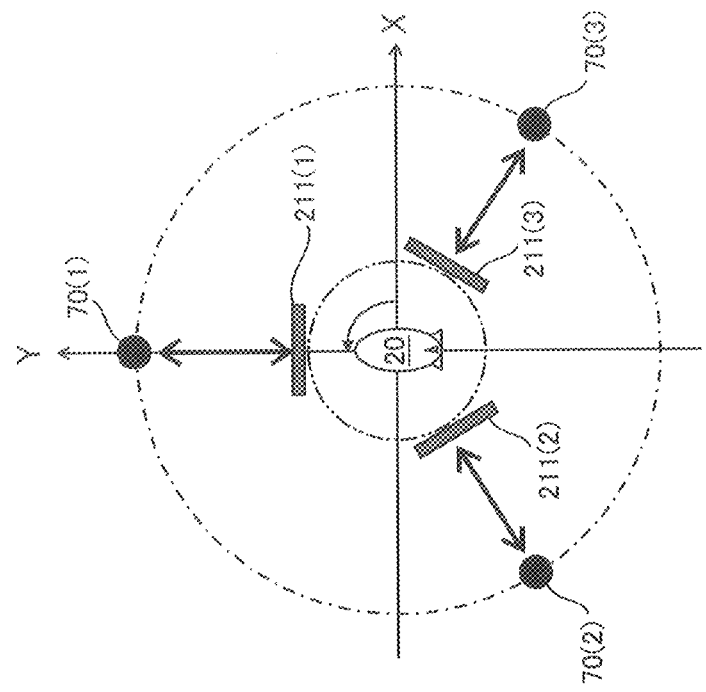
FIG. 2B is a top view illustration of a relationship between plural antennas for feeder link of a HAPS and plural GW stations.
Figure 2A:
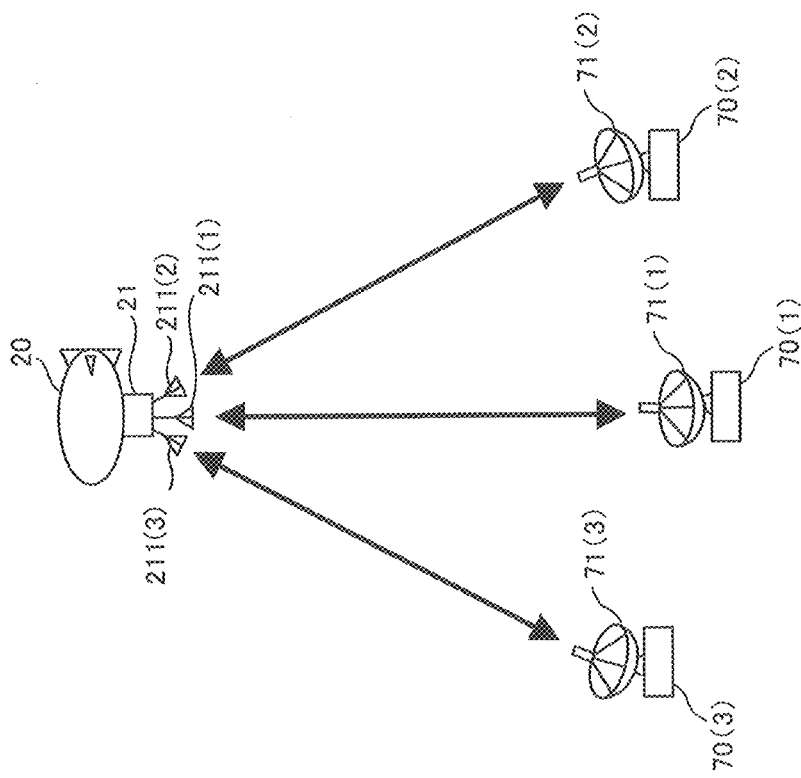
FIG. 2A is a side view showing an example of a schematic configuration of plural GW systems according to the embodiment.

FIG. 2A is a side view showing an example of a schematic configuration of plural GW systems according to the embodiment, and FIG. 2B is a top view illustration of a relationship between plural FL antennas 211(1) to 211(3) of the HAPS 20 and plural GW stations 70(1) to 70(3). In the illustrated example, each of the number of FL antennas (N) and the number of GW stations (N) is the same number (3 in the illustrated example), and the same number of FL antennas 211(1) to 211(3) and GW stations 70(1) to 70(3) are provided in a one-to-one correspondence with each other. The number of sets of the FL antenna 211 and the GW station 70 may be two sets, or may be four or more sets. Further, in the illustrated example, although the plural GW stations 70 are disposed so that distances from the HAPS 20 and intervals between the GW stations are equal to each other, at least one of the distances and the intervals may be different from each other. Each GW station 70 is disposed so that complex amplitudes received by each FL antenna 211 (also referred to as "HAPS station antenna") of the HAPS 20 are uncorrelated. Further, the antennas for feeder link (hereinafter referred to as "GW antennas") 71(1) to 71(3) of the GW stations 70(1) to 70(3) can transmit and receive radio signals with two kinds of polarized waves of vertically polarized waves (V) and horizontally polarized waves (H) which are orthogonal to each other. In the illustrated example, although the plural FL antennas 211(1) to 211(3) of the HAPS 20 are disposed so that distances from the center of the HAPS 20 and intervals between the FL antennas are equal to each other, at least one of the distances and the intervals may be different from each other between the FL antennas. For example, the distances and the intervals may be different from each other between the FL antennas.

Figure 3:
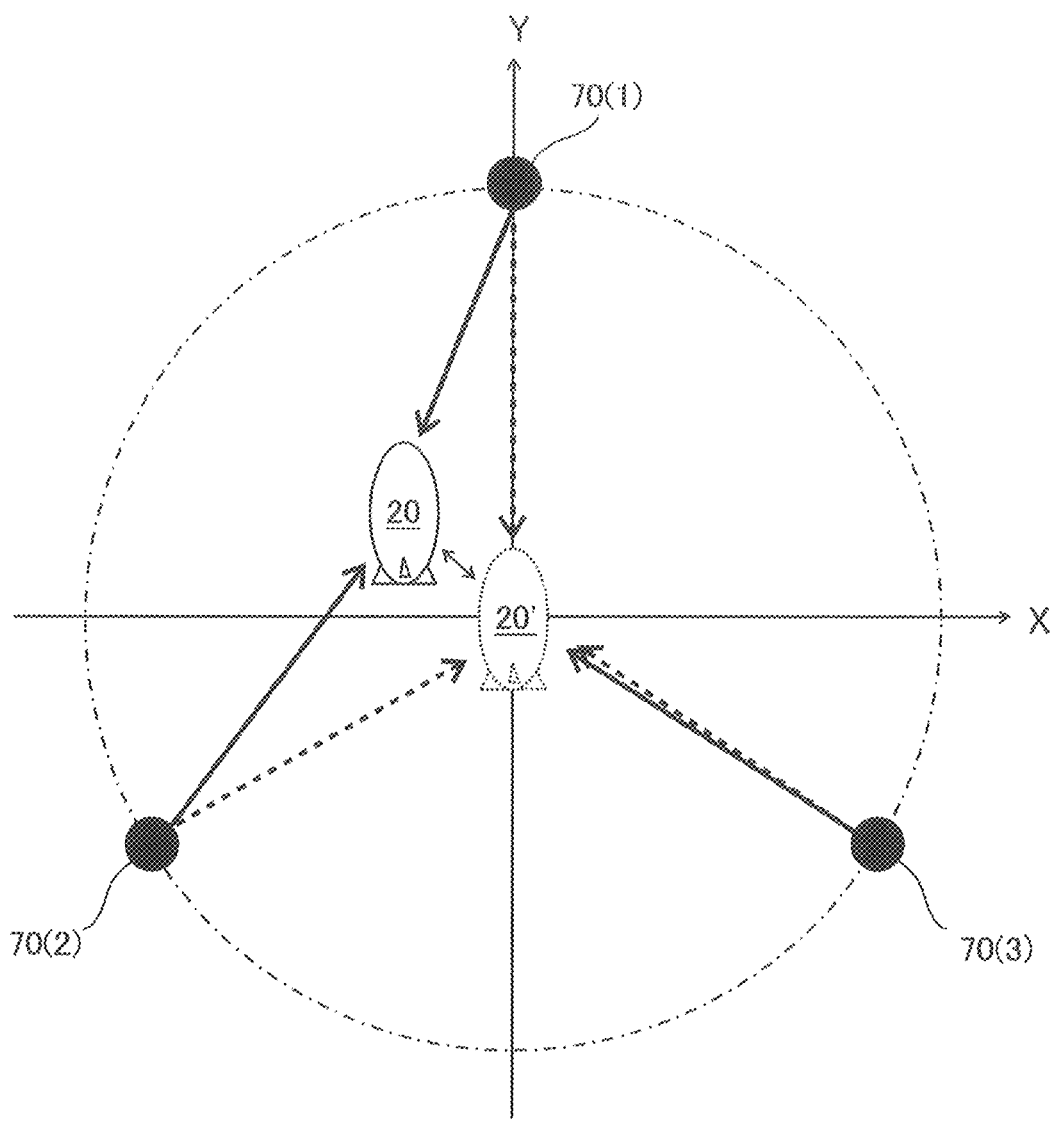
FIG. 3 is an illustration showing an example of state in which GW antennas of plural GW stations are tracking a HAPS according to the embodiment.

As shown in FIG. 3, each of the plural GW stations 70(1) to 70(3) may include an antenna control section that controls the GW antennas 71(1) to 71(3) so as to track the HAPS 20 moving in an airspace. A HAPS 20' with dashed lines in the figure indicates a position before the movement, and a solid-lined HAPS 20 in the figure indicates a position after the movement. By tracking the HAPS 20 by each of the GW antennas 71(1) to 71(3), even when using the GW antennas 71(1) to 71(3) with high directivity such as a parabolic antenna, it is capable of suppressing the deterioration of the communication quality of the feeder link due to the movement of the HAPS 20.

Figure 4:
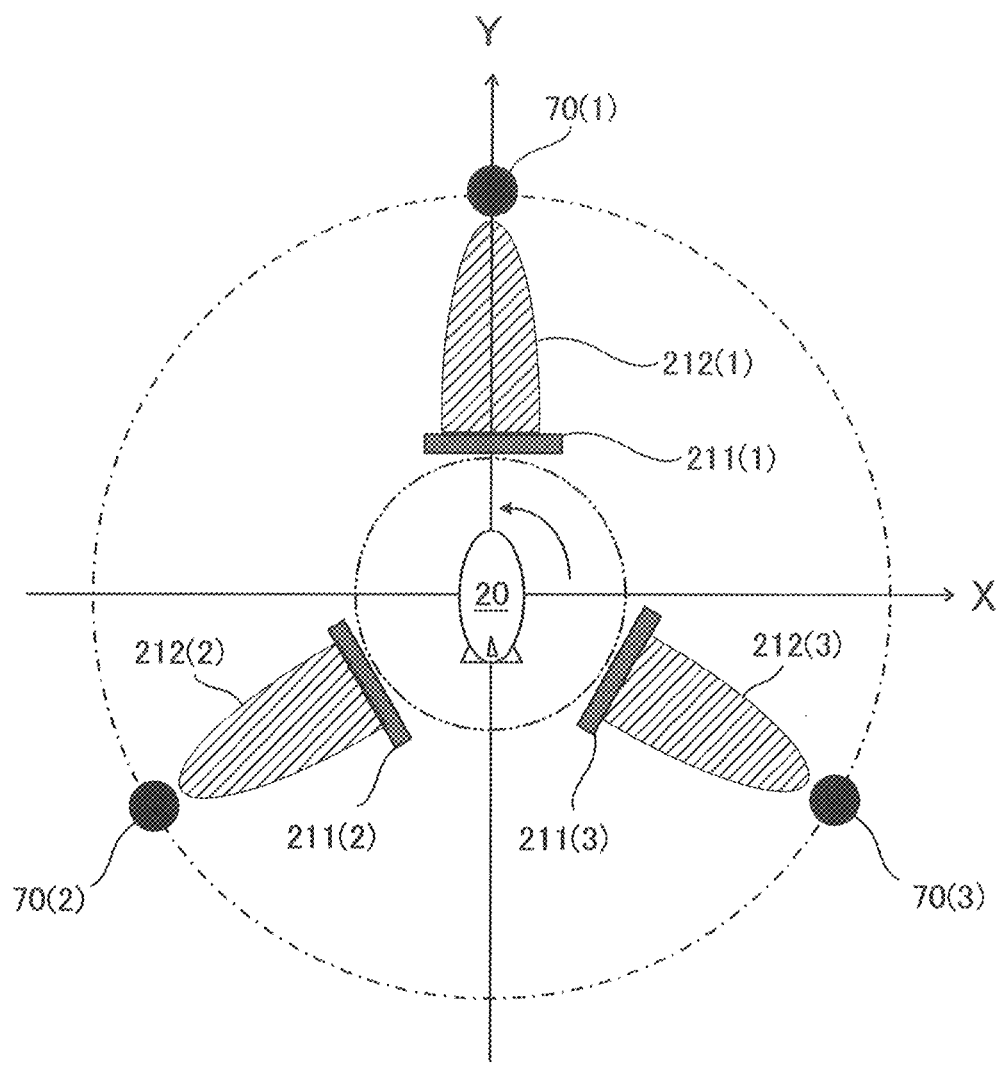
FIG. 4 is an illustration showing an example of directional beams of plural FL antennas of a HAPS according to the embodiment.

As shown in FIG. 4, the plural FL antennas 211(1) to 211(3) of the HAPS 20 may include antenna directional beams (hereinafter referred to as "directional beams" or "beams") 212(1) to 212(3) respectively corresponding to the GW stations 70(1) to 70(3), and the HAPS 20 may include an antenna control section that controls the FL antennas 211(1) to 211(3) so that the directional beams 212(1) to 212(3) of the plural FL antennas 211(1) to 211(3) is respectively directed in the direction of the corresponding GW stations 70(1) to 70(3). Each of the directional beams 212(1) to 212(3) of the FL antennas 211(1) to 211(3) is formed, for example, so as to face the GW station 70 closest to itself and not to provide an interference to other GW stations, that is, so that a ratio (F/B) of a gain of the main beam and a gain in the opposite direction becomes sufficiently large. As a result, even when the HAPS 20 moves or rotates, it is possible to suppress the deterioration of the communication quality of the feeder link due to the movement and rotation of the HAPS 20.

As a control system of the directional beams 212(1) to 212(3) of the plural FL antennas 211(1) to 211(3) by the antenna control section of the HAPS 20, it is capable of using various systems such as a gimbal system, an electric system (360-degrees beamforming control system), and an electric system (angle-limited beamforming control system+ antenna switching).

Figure 5:
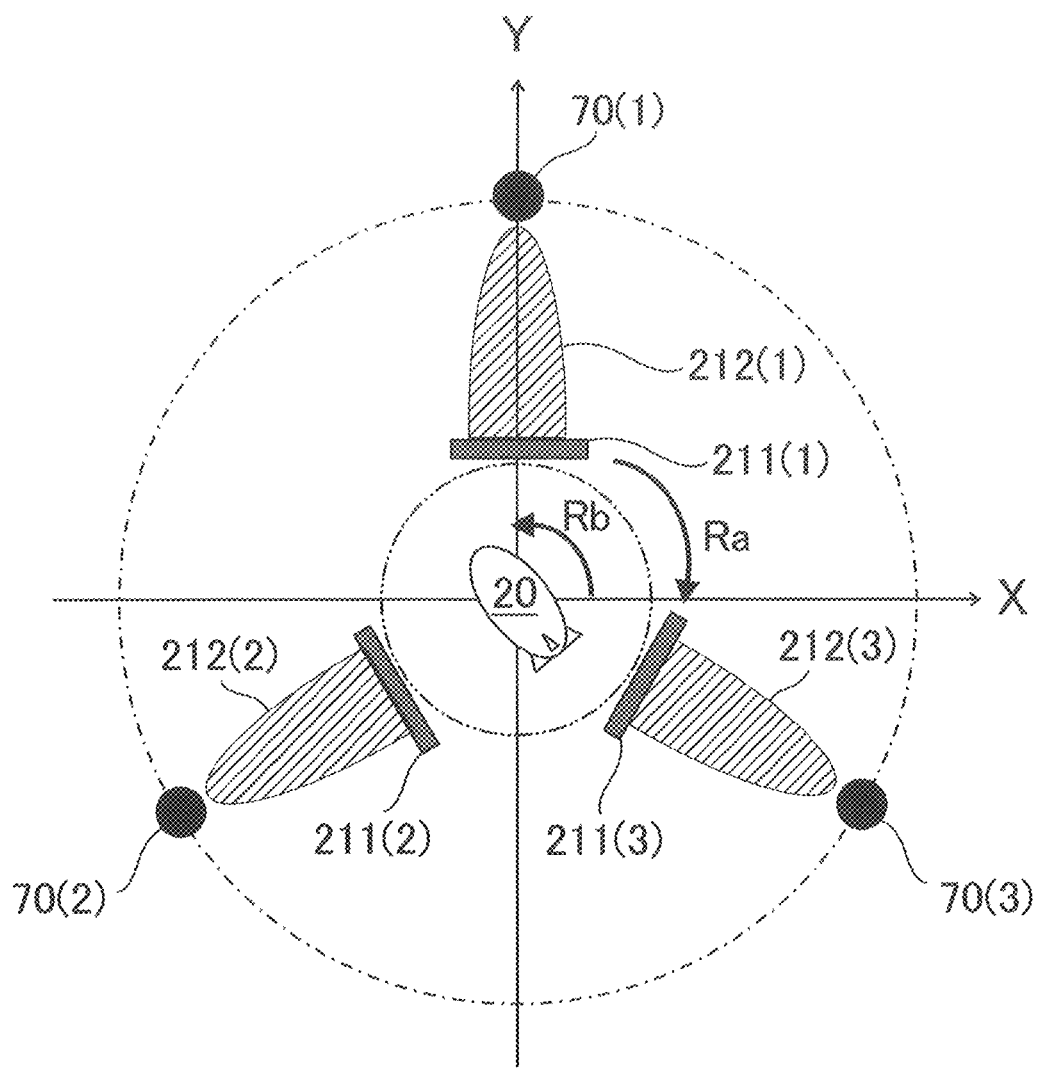
FIG. 5 is an illustration showing an example of a directional beam control of FL antennas in a HAPS according to the embodiment.

For example, in the gimbal system in FIG. 5, in accordance with the rotation (turning) around the vertical axis (yawing axis, Z axis) of the HAPS 20, the rotation drive of the whole of plural FL antennas 211(1) to 211(3) can be mechanically controlled around the foregoing axis. For example, in FIG. 5, when the HAPS 20 rotates about 45 degrees in the left direction of rotation (counterclockwise direction) Rb, the rotation of the whole of plural FL antennas 211(1) to 211(3) are mechanically driven in the right direction of rotation (clockwise direction) Ra opposite to the foregoing direction of rotation of the HAPS 20.

Although the rotational drive control for angle adjustment of each of the FL antennas 211(1) to 211(3) may be performed with reference to information on a position and an orientation of the HAPS, the rotational drive control of respective FL antenna 211(1) to 211(3) may be performed with reference to reception level values of the FL antennas 211(1) to 211(3). For example, each of the FL antennas 211(1) to 211(3) is rotated in small steps, an angle for maximizing the reception level of each of the FL antennas 211(1) to 211(3) is found, and the rotational drive control of each of the FL antennas 211(1) to 211(3) is performed so as to face the angle. Herein, a threshold value may be set for each of the reception levels of each of the FL antennas

211(1) to 211(3), each of the FL antennas 211(1) to 211(3) may be rotated by a predetermined angle when the reception level falls below the foregoing threshold, and the rotational drive control of the FL antennas 211(1) to 211(3) may be performed to the directional angle at which the reception level is maximized. The threshold value of the reception level may be obtained, for example, by an experiment in advance, and the predetermined angle may be, for example, 360 degrees/number of FL antennas (120 degrees in the illustrated example). Further, a monitoring beam for comparing the reception level from the GW stations other than the corresponding GW station may be generated from the FL antenna 211(1) to 211(3), a GW station having the maximum level may be selected, and the rotational drive of each of the FL antennas 211(1) to 211(3) may be controlled so that the directional beam is directed in the direction to the selected GW station.

It is noted that, although the angle adjustment in the horizontal direction of each of the FL antennas 211(1) to 211(3) is shown in FIG. 5, the angle adjustment in the vertical direction may be also performed in the same manner.

By the rotational drive control of the FL antennas 211(1) to 211(3), even if the HAPS 20 rotates, since the directional beams 212(1) to 212(3) of the FL antennas 211(1) to 211(3) are directed in the corresponding directions of the GW stations 70(1) to 70(3) respectively, the deterioration of the communication quality of the feeder link can be prevented.

Figure 6:
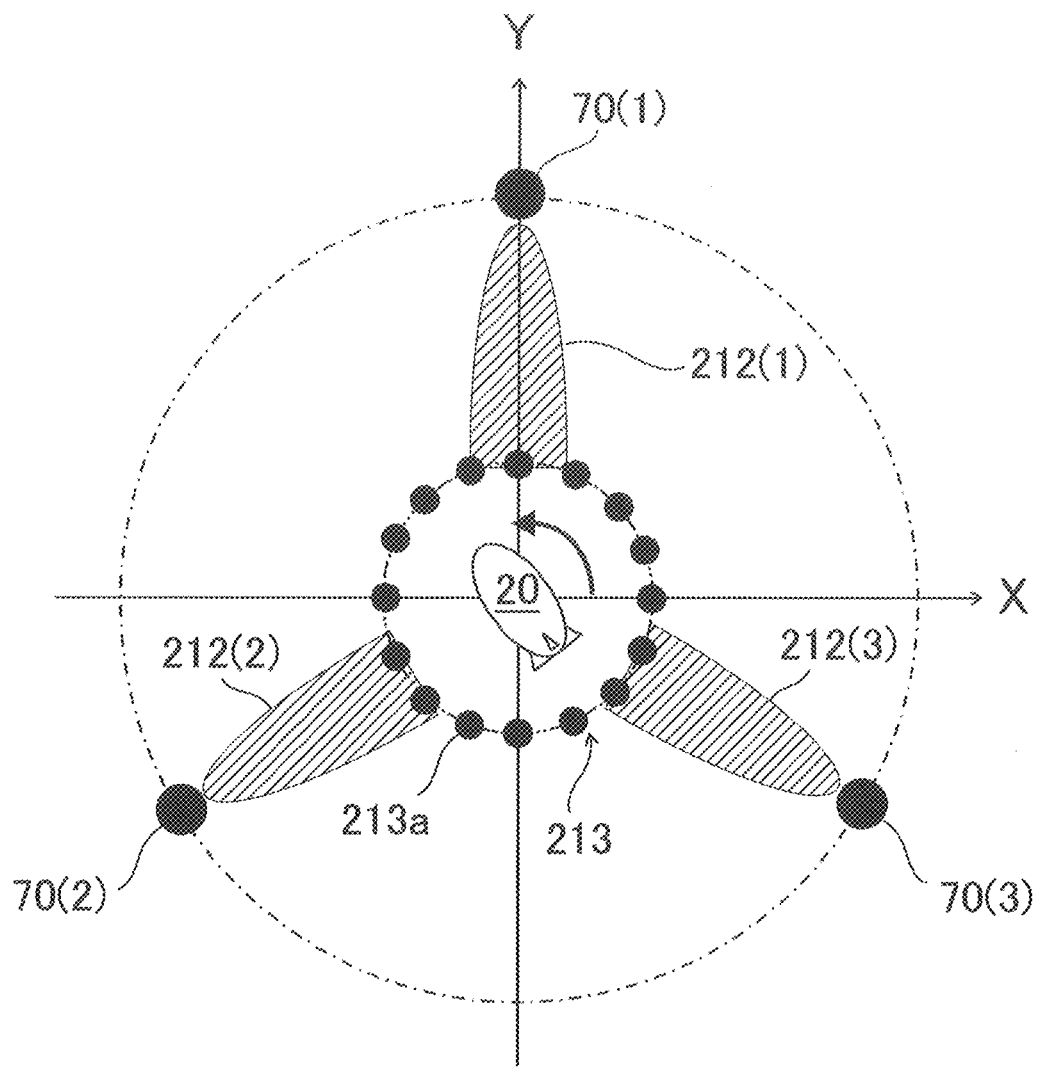
FIG. 6 is an illustration showing another example of a directional beam control of FL antennas in a HAPS according to the embodiment.

In the electric system (360-degrees beamforming control system) in FIG. 6, a circular array antenna 213 in which plural antenna elements 213a are disposed along the circumferential shape is provided as a FL antenna. Based on information on a position and an attitude of the HAPS 20, a weight applied to signals (amplitude, phase) transmitted and received via each of the plural antenna elements 213a is controlled. For example, the information on the position and the attitude of the HAPS 20 may be acquired based on an output of a GNSS Inertial Navigation System (GNSS/INS) that is a combination of a GNSS (Global Navigation Satellite System) system and an Inertial Measurement Unit (IMU) incorporated in the HAPS 20.

Although the weight control of each antenna element 213a of the circular array antenna 213 may be performed with reference to the information on the position and the attitude of the HAPS, the weight control of each antenna element 213a may be performed so as to form a directional beam having the maximum reception level at a directional position corresponding to each GW station with reference to the reception level value of each antenna element 213a of the circular array antenna 213. For example, a phase of each antenna element 213a of the circular array antenna 213 is changed in small steps, an angle for maximizing the reception level is found, and the weight control of each antenna element 213a is performed so that a beam is formed in the direction of the found angle. Further, a monitoring beam for comparing the reception level from the GW stations other than the corresponding GW station may be generated from the circular array antenna 213, a GW station having the maximum level may be selected, and a beam may be formed in the direction to the selected GW station.

It is noted that, although the beam angle adjustment in the horizontal direction is shown in FIG. 6, the beam angle adjustment may be also performed in the same manner in the vertical direction.

By controlling the weight of each antenna element 213a of the circular array antenna 213, the directional beams 212(1) to 212(3) respectively directed in the directions to the plural GW stations 70(1) to 70(3) are formed. As a result, even if the HAPS 20 rotates, since the directional beams 212(1) to 212(3) of the FL antennas 211(1) to 211(3) are directed in the corresponding directions to the GW stations 70(1) to 70(3) respectively, the deterioration of the communication quality of the feeder link can be prevented.

Figure 7:
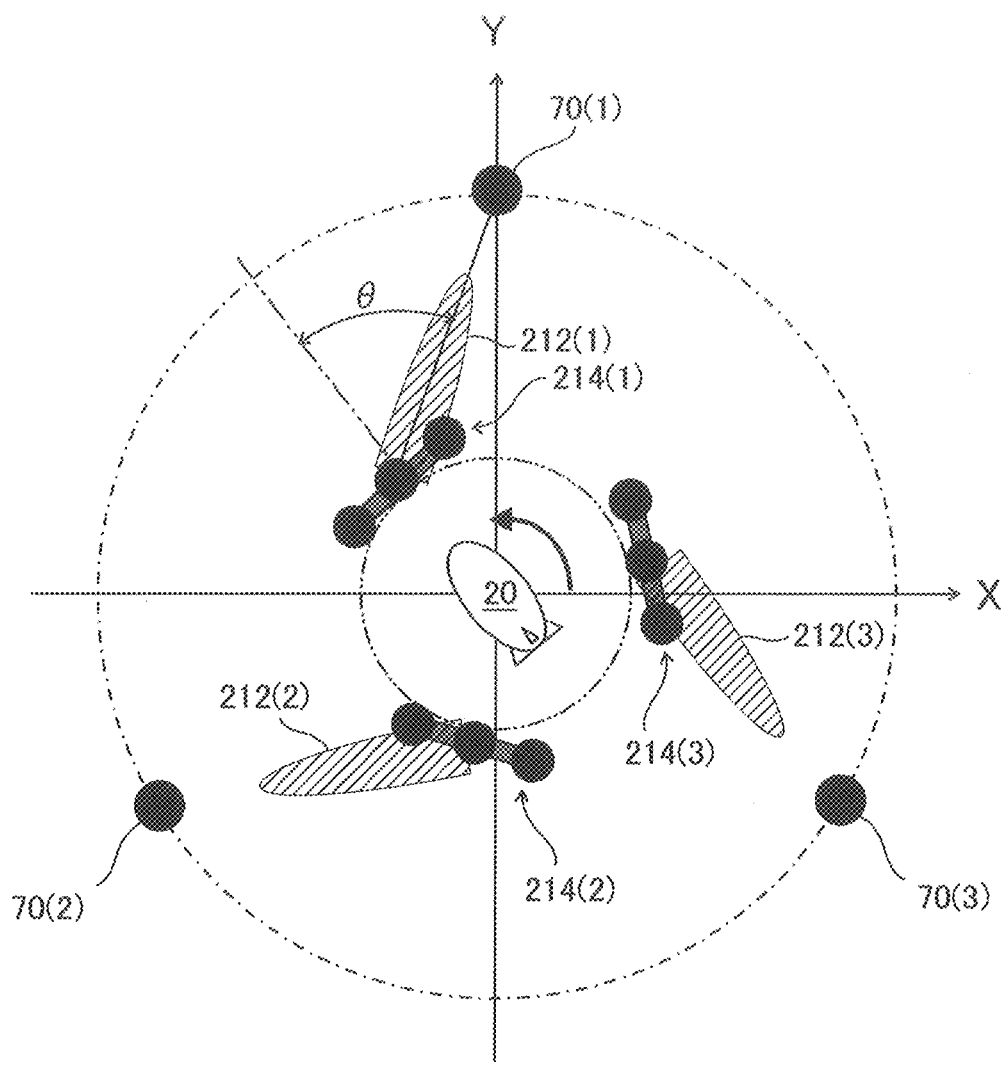
FIG. 7 is an illustration showing yet another example of a directional beam control of FL antennas in a HAPS according to the embodiment.

In the electric system (beamforming control system with limited angle+antenna switching) of FIG. 7, plural planar array antennas 214(1) to 214(3) in which plural antenna elements 214a of each array antenna are two-dimensionally disposed in a plane are provided as a FL antenna. Based on information on the position and the attitude of the HAPS 20 acquired by GNSS/INS etc., a beamforming control is performed to control a weight applied to a signal (amplitude, phase) transmitted and received via each of the plural antenna elements 214a of the plural planar array antennas 214(1) to 214(3).

Although the control of the switching and the beamforming of the planar array antennas 214(1) to 214(3) may be performed with reference to the information on the position and the attitude of the HAPS, the antenna switching and beamforming may be controlled so that each of the planar array antennas 214(1) to 214(3) has the maximum reception level with reference to the reception level value of each planar array antenna 214(1) to 214(3). For example, each of the planar array antenna 214 (1) to 214 (3) is rotated in small steps, an angle for maximizing the reception level of respective planar array antenna 214(1) to 214(3) is found, and the rotational drive control of each antenna is performed so as to be directed to the found angle. Herein, a threshold value may be set for each of the reception levels of each of the planar array antenna 214(1) to 214(3), when the reception level falls below the foregoing threshold value, the planar array antennas 214(1) to 214(3) may be switched and each of the planar array antenna 214(1) to 214(3) may be rotated by a predetermined angle, and a beamforming may be performed to form a beam to the directional angle at which the reception level is maximized. The threshold value of the reception level may be obtained, for example, by an experiment in advance, and the predetermined angle may be, for example, 360 degrees/number of FL antennas (120 degrees in the illustrated example). Further, a monitoring beam for comparing the reception level from the GW stations other than the corresponding GW station may be generated from the planar array antenna 214(1) to 214(3), a GW station, for which each of the planar array antenna 214(1) to 214(3) has the maximum level, may be selected, and an antenna switching and a beamforming may be performed so as to form a beam in the direction to the selected GW station.

It is noted that, although the beam angle adjustment in the horizontal direction is shown in FIG. 7, the beam angle adjustment may be also performed in the same manner in the vertical direction.

By controlling the switching and the beamforming of the planar array antennas 214(1) to 214(3), the directional beams 212(1) to 212(3) respectively directed in the directions to the plural GW stations 70(1) to 70(3) are formed. Herein, for example, when the angle (θ in the figure) at which the directional beam 212(1) is tilted with respect to the normal direction perpendicular to the plane of the planar array antenna 214(1) becomes larger than the preset predetermined angle 0th degrees, the FL antenna corresponding to the GW station 70(1) is switched to the planar array antenna 214(2). As a result, even if the HAPS 20 rotates, each of the directional beams 212(1) to 212(3) of the FL antennas 211(1) to 211(3) are directed in the directions to the corresponding GW stations 70(1) to 70(3), so that the deterioration of the communication quality of the feeder link can be prevented.

Figure 8:
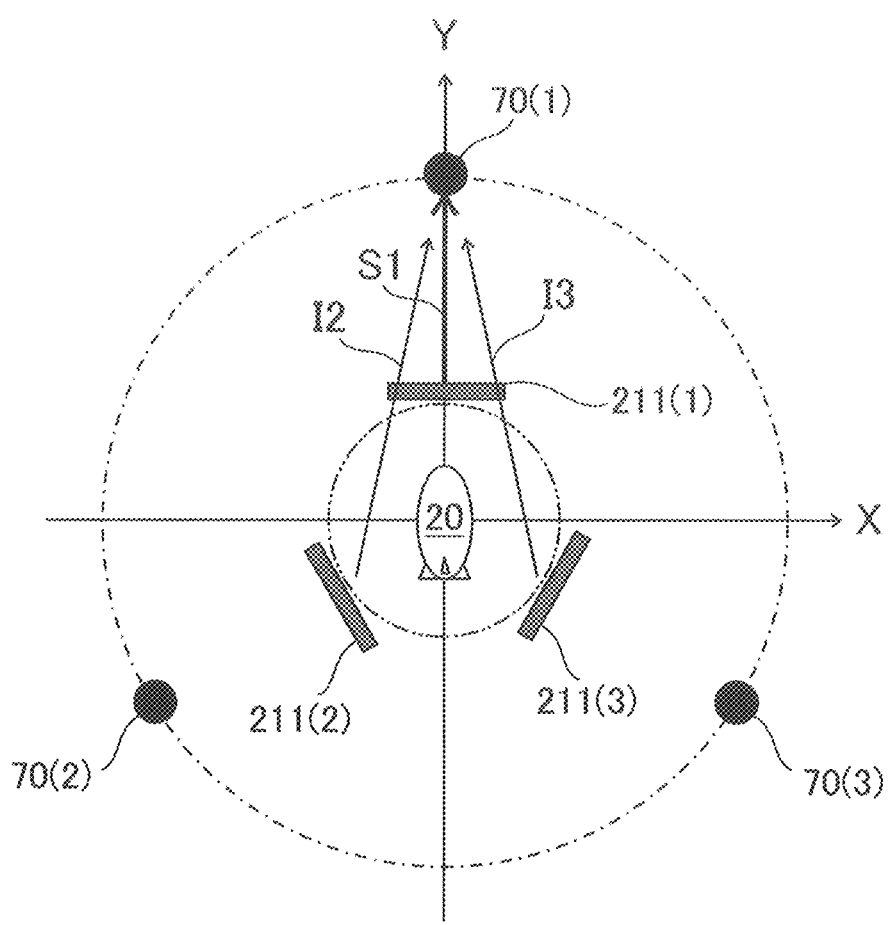
FIG. 8 is an illustration of an example of a reverse link interference between GW stations (between feeder links) in plural GW systems.

In the plural GW systems with the above-described configuration, not only an interference of the forward link between the GW stations (between feeder links) but also an interference of the reverse link may increase. For example, as shown in FIG. 8, while a desired signal (desired signal) S1 transmitted from the FL antenna 211(1) of the HAPS 20 is received by the GW station 70(1), signals transmitted from the other FL antennas 211(2) and 211(3) of the HAPS 20 are received as interference signals I2 and I3 by the GW station 70(1). Accordingly, SINR characteristics of the feeder link (reverse link) may deteriorate.

Therefore, in the present embodiment, by applying a MIMO interference canceller supporting the line-of-sight environment (LOS: Line-Of-Sight) between the GW stations (between the feeder links) as shown below, and by reducing an interference of reverse link between the GW stations (between the feeder links), the SINR characteristics of the feeder link (reverse link) are improved.

[MIMO Interference Canceller (Reception-Interference Canceller) on GW Station Side (Reception Side)]

Figures 9A, 9B:
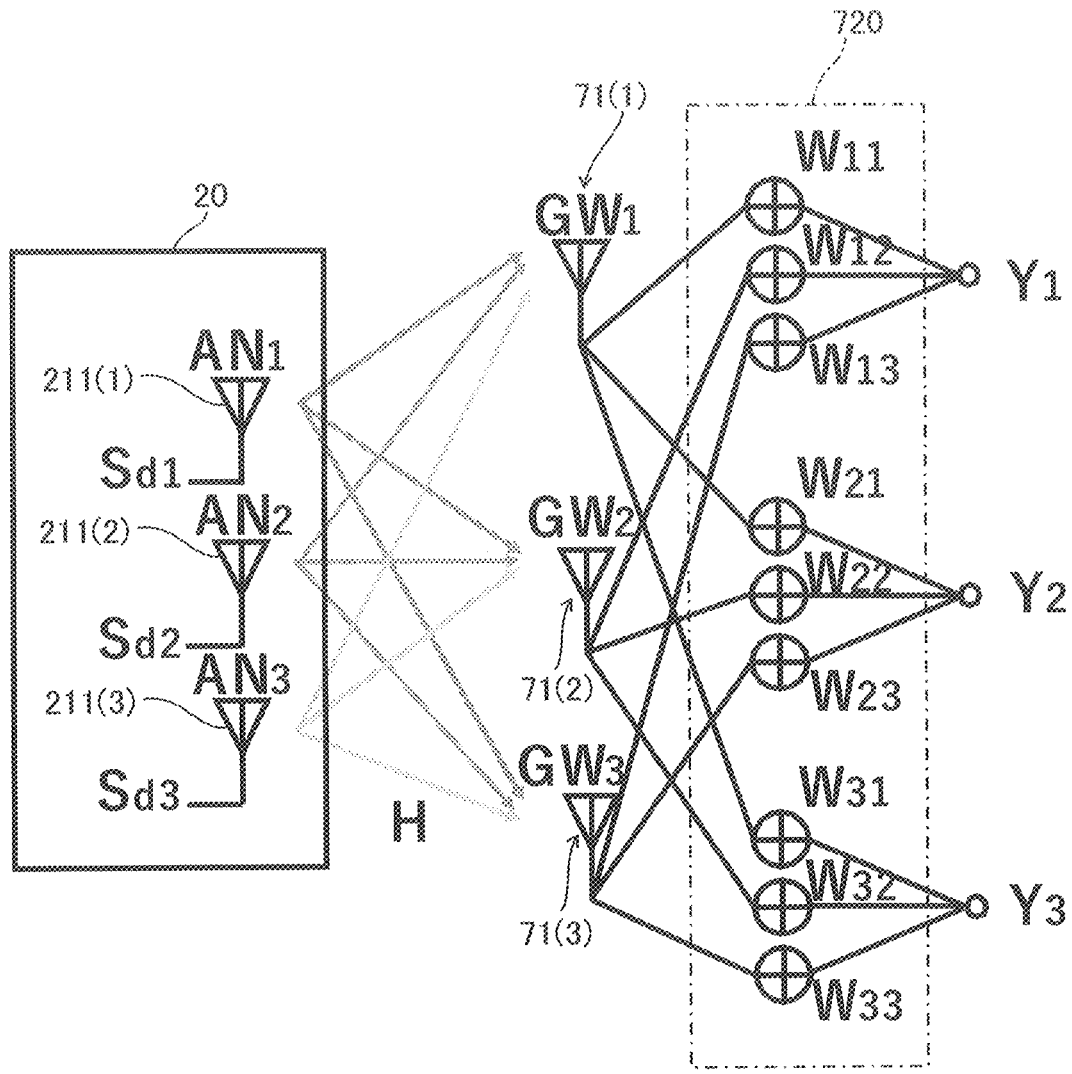
FIG. 9A is an illustration showing an example of a schematic configuration of an interference canceller section of a reverse link provided on GW station side (reception side) in a multi-feeder link of plural GW systems according to the embodiment.
FIG. 9B is an illustration showing a relationship between a transmission signal S and a reception signal Y.
Figure 10:
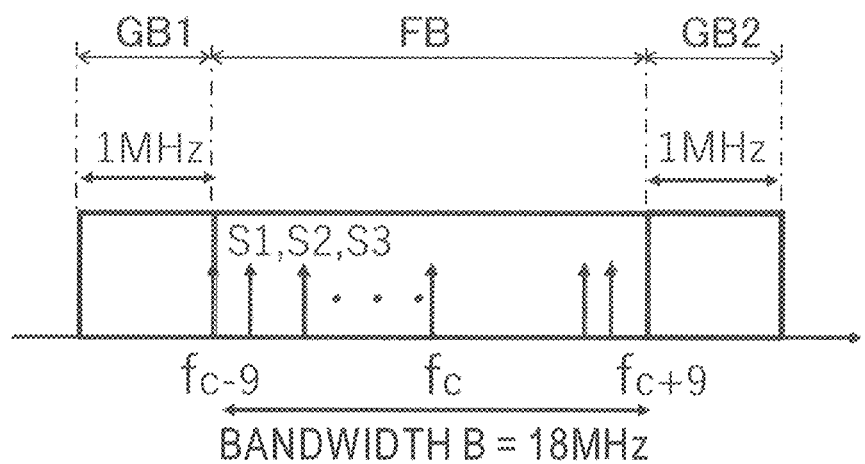
FIG. 10 is an explanatory diagram showing an example of a transmission signal band of a feeder link in plural GW systems.

FIG. 9A is an illustration showing an example of a schematic configuration of an interference canceller section 720 of a reverse link provided on the GW station side (reception side) in a multi-feeder link of the plural GW systems according to the embodiment, and FIG. 9B is an illustration showing a relationship between a transmission signal S and a reception signal Y. FIG. 10 is an illustration showing an example of a transmission signal band of a feeder link in the plural GW systems. The interference canceller section 720 is provided in, for example, a common apparatus 700 connected to transmitters/receivers of GW antennas 71(1), 71(2), 71(3) of the plural GW stations 70(1), 70(2), 70(3) by a communication line (interface). It is noted that, the common apparatus 700 may be an apparatus (for example, remote control apparatus, server, etc. installed in a communication center, control center, etc. of a mobile communication network) disposed at a location where information is concentrated from the plural GW stations 70(1), 70(2), 70(3). The interference canceller section 720 may be provided in any one of the GW stations 70(1), 70(2), 70(3) connected to each other by the communication line (interface), and data such as a reception result for interference cancellation, a propagation path response and a weight may be shared between the GW stations.

In FIG. 9A, for example, the GW antenna 71(1) receives a desired signal S1 (Y11) transmitted from the FL antenna 211(1) of the HAPS 20, an interference signal I2 (Y12) transmitted from the FL antenna 211(2) of the HAPS 20, and an interference signal I3 (Y13) transmitted from FL antenna 211(3) of the HAPS 20. The reception signal AN1 is represented by the following equation (1).

$$AN1 = S1 + I2 + I3 \tag{1}$$

In the interference canceller section 720, as shown in the following equation (2), by multiplying the signals S2 and S3 received by the other GW antennas 71(2) and 71(3), by the weights W2 and W3 respectively corresponding to the signals S2 and S3, and adding or subtracting them, the desired signal S1 (Y11), in which the interference signals I2 and I3 are canceled, can be output. Similarly, for the desired signals S2 (Y22) and S3 (Y33) transmitted from the FL antennas 211(2) and 211(3) of the HAPS 20, the interference signals from the other FL antennas can be canceled.

$$S1 = w11 \cdot AN1 + w12 \cdot AN2 + w13 \cdot AN3 \tag{2}$$

The interference canceller section 720 can use a weight W calculated with a propagation path response matrix (propagation path response matrix H) by the ZF (Zero-Forcing) method. For example, the signal transmitted from the FL antenna 211(1) of the HAPS 20 is not only received as the desired signal S1 (Y11) by the GW antenna 71(1), but also received as interference signals I1 (Y12) and I1' (Y13) by the GW antennas 71(2) and 71(3). Further, the signal transmitted from the FL antenna 211(2) of the HAPS 20 is not only received as an interference signal I2 (Y21) by the GW antenna 71(1), but also received as an interference signal I2' (Y23) by the GW antenna 71(3). Moreover, the signal transmitted from the FL antenna 211(3) of the HAPS 20 is not only received as an interference signal I3 (Y31) by the GW antenna 71(1), but also received as an interference signal I3' (Y32) by the GW antenna 71(2). In the interference canceller section 720, these interference signals I1, I1', I2' and I3' are considered and the desired signal S1 (Y11) is outputted, for example, as shown in the following equation (3). As a result, the accuracy of interference suppression in the reverse link between GW stations (between feeder links) can be improved.

$$S1 = w11(Y11+Y12+Y13) + w12(Y21+Y22+Y23) + w13(Y31+Y32+Y33) \tag{3}$$

In order to calculate the weight W used for the interference canceller section (MIMO interference canceller) 720, it is necessary to grasp propagation path responses (propagation path response matrix H) between the GW antennas 71(1) to 71(3) of the GW stations 70(1) to 70(3) and the FL antennas 211(1) to 211(3) of the HAPS 20. In particular, in the plural GW systems of the present embodiment, since an airship of the HAPS 20 moves relative to the GW antennas 71(1) to 71(3) of the GW stations 70(1) to 70(3), the propagation path responses (propagation path response matrix H) also change according to the movement.

Therefore, in the present embodiment, in order to grasp the propagation path response (propagation path response matrix H), plural pilot signals having frequencies different from each other are transmitted from the FL antennas 211(1) to 211(3) of the HAPS 20. A frequency band of the pilot signal is a narrow band, and the pilot signals have transmission frequencies different from each other (orthogonal to each other). The interference canceller section 720 estimates the propagation path response (propagation path response matrix H) at the center frequency fsc of the transmission signal band of the feeder link, based on the pilot signals received from each of the FL antennas 211(1) to 211(3), and derives the weight W.

The pilot signals transmitted from each of the FL antennas 211(1) to 211(3) of the HAPS 20 may be arranged, for example, in a first guard band GB1 that is a first adjacent band of a transmission signal band FB of the feeder link for transmitting the desired signals S1, S2, S3 shown in FIG. 10, which is adjacent to the transmission signal band FB from low frequency side, or may be arranged in a second guard band GB2 that is a second adjacent band adjacent to the transmission signal band FB from high frequency side. The pilot signals may be arranged in both of the first guard band GB1 and the second guard band GB2. The pilot signal transmitted from each of the FL antennas 211(1) to 211(3) may be a single pilot signal or plural pilot signals.

It is noted that, the interference canceller section 720 provided on the GW station side (reception side) may have a band-division reception interference canceller function that divides a band of reception signal received from the relay communication station 21 of the HAPS 20 into N divisions (for example, 2 divisions or 3 divisions) on the frequency axis and multiplies the weight W.

The band-division reception interference canceller function in the interference canceller section 720 is executed, for example, as follows. First, the interference canceller section 720 receives plural pilot signals transmitted from the relay communication station 21 of the HAPS 20, and separates each of the received plural pilot signals with a filter.

Next, the interference canceller section 720 divides the transmission signal band FB of the feeder link into plural divided bands FB(1) to FB(N), and estimates plural propagation path responses between the GW station 70 and the FL antennas 211(1) to 211(3) of the HAPS 20 for each of the plural divided bands FB(1) to FB(N), with the center frequencies $f_{d1}$ to $f_{dN}$ of each of the plural divided bands FB(1) to FB(N) as estimated frequencies, based on reception results of the pilot signals received from the relay communication station 21 and separated.

Next, the interference canceller section 720 calculates, for each divided band, a weight W for suppressing an interference signal that causes an interference by the transmission signal transmitted from the relay communication station 21 of the HAPS 20 to the GW station 70 and received by another GW station 70, based on the propagation path response of each of the plural divided bands.

Next, the interference canceller section 720 generates a divided reception signal for each divided band, by adding or subtracting, for the reception signal received from the relay communication station 21 by the GW station 70, the reception signal received by the other GW station 70 that is multiplied by the weight W corresponding to the other GW station, and generates a reception signal by synthesizing the divided reception signals of the plural divided bands.

In the interference canceller section 720 provided on the GW station side (reception side) of FIG. 9A, since each of the GW antennas 71(1) to 71(3) of the GW station 70(1) to 70(3) are far apart from each other (for example, by a separation distance of 50 to 100 km), for example, the common apparatus 700 or any one of the GW stations 70(1) to 70(3) performs the following processing.

(1) The propagation path response matrix H is generated by collecting the propagation path responses respectively received and measured by the GW antennas 71(1) to 71(3) or exchanging the propagation path responses with each other between GW stations.

(2) The weight W of the interference canceller is determined, and the interference of the reverse-link reception signal received by each receiver is canceled.

Since the GW antenna 71(1) to 71(3) are far away from each other, a delay occurs between the receivers of GW station 70(1) to 70(3). Therefore, a highly accurate time synchronization between the GW stations 70(1) to 70(3) is required in consideration of the separation distance between the common apparatus 700 and the receivers of GW stations 70(1) to 70(3) or the separation distance between the receivers of GW stations 70(1) to 70(3). Further, a transmission line for collecting the propagation path responses of the GW stations 70(1) to 70(3) or exchanging the propagation path responses with each other between the GW stations is also required, which complicates the processing of the interference canceller section 720.

Therefore, as shown below, an interference canceller of the reverse link in the multi-feeder link may be provided on the HAPS 20 side.

[MIMO Interference Canceller Equipped with HAPS (Transmission-Interference Canceller)]

Figures 11A, 11B:
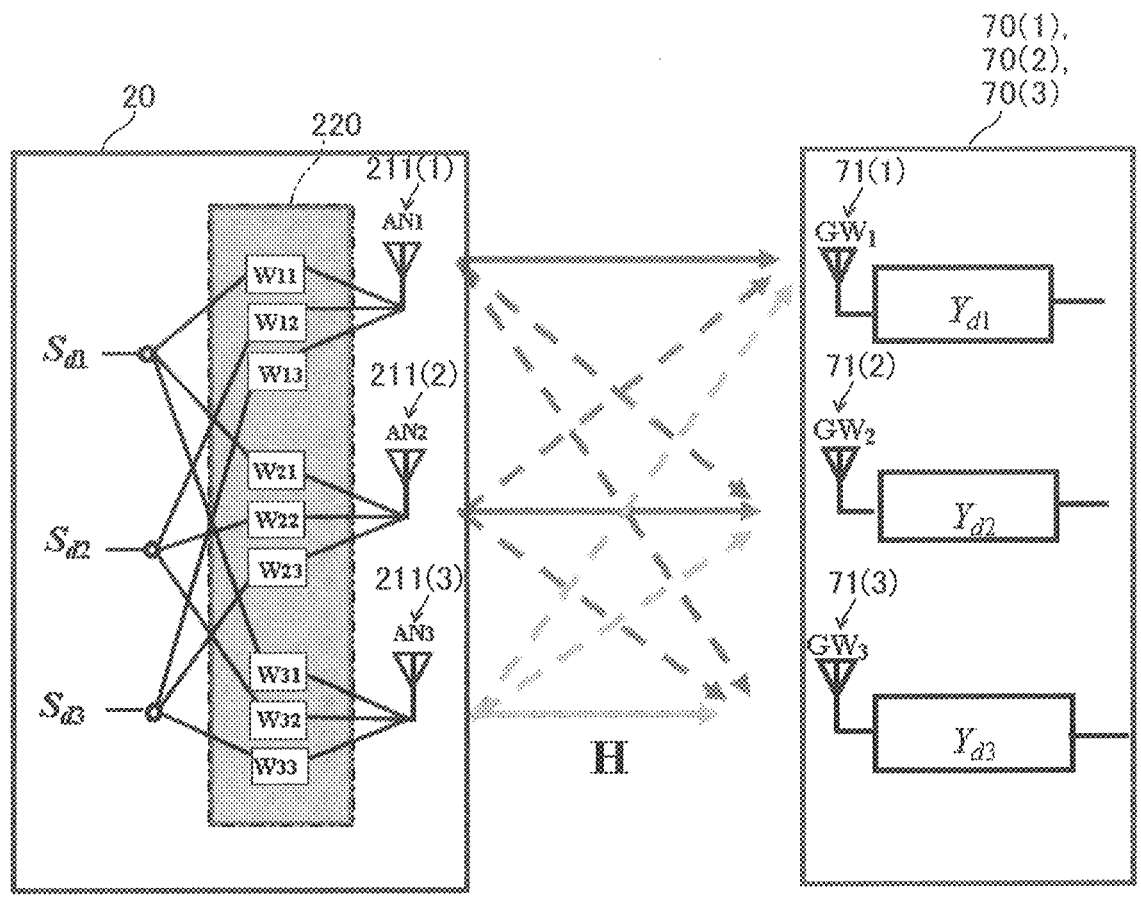
FIG. 11A is an illustration showing an example of a schematic configuration of an interference canceller section of a reverse link provided on HAPS side (transmission side) in a multi-feeder link of plural GW systems according to another embodiment.
FIG. 11B is an illustration showing a relationship between a transmission signal S and a reception signal Y.

FIG. 11A is an illustration showing an example of a schematic configuration of an interference canceller section 220 of the reverse link provided on the HAPS 20 side (transmission side) in the multi-feeder link of the plural GW systems according to another embodiment, and FIG. 11B is an illustration showing a relationship between the transmission signal S and the reception signal Y. The interference canceller section 220 of FIG. 11A has a function of a transmission-interference canceller that suppresses an interference from another transmitter in the HAPS 20 with respect to reception signals of respective GW station 70(1) to 70(3), by multiplying a transmission signal of each transmitter in the HAPS 20 having a short distance between transmitters (for example, several meters) by a weight (hereinafter referred to as "transmission weight") W and transmitting it.

In the example of the interference canceller section 220 of FIG. 11A, the interference canceling process is performed by the transmitter of the HAPS 20, and the interference canceling process is not performed by the receiver on the GW station side where the distance between the receivers is long (50 to 100 km). In order to calculate the transmission weight W by the interference canceller section 220, the propagation path response matrix H in the propagation path of the downlink, which is the reverse link of the feeder link, from the HAPS 20 to each GW station 70(1) to 70(3) is required.

Since the airship of the HAPS 20 moves relative to the GW antennas 71(1) to 71(3) of the GW stations 70(1) to 70(3) as described above, the downlink propagation path response (propagation path response matrix H) also changes according to the movement. Therefore, also in the present example, in order to grasp the propagation path response (propagation path response matrix H), plural pilot signals having frequencies different from each other are used. The frequency band of the pilot signal is a narrow band, and each pilot signal has a different transmission frequency from each other (orthogonal to each other). The interference canceller section 220 estimates the propagation path response (propagation path response matrix H) of the center frequency fsc of the transmission signal band of the feeder link, based on the pilot signal, and derives the transmission weight W.

The pilot signal is arranged, for example, in the first guard band GB1, the second guard band GB2 or both of them, wherein the guard band is adjacent to the transmission signal band FB of the feeder link in which the desired signals S1, S2, and S3 are transmitted shown in FIG. 10 described above.

As a method of estimating the propagation path response (propagation path response matrix H) of the feeder link and calculating the transmission weight W, for example, there are a method of using a downlink pilot signal and a method of using an uplink pilot signal.

[Calculation Method of Transmission Weight W Using Downlink Pilot Signal]

First, it is described of a case of using a downlink pilot signal.

Figure 12:
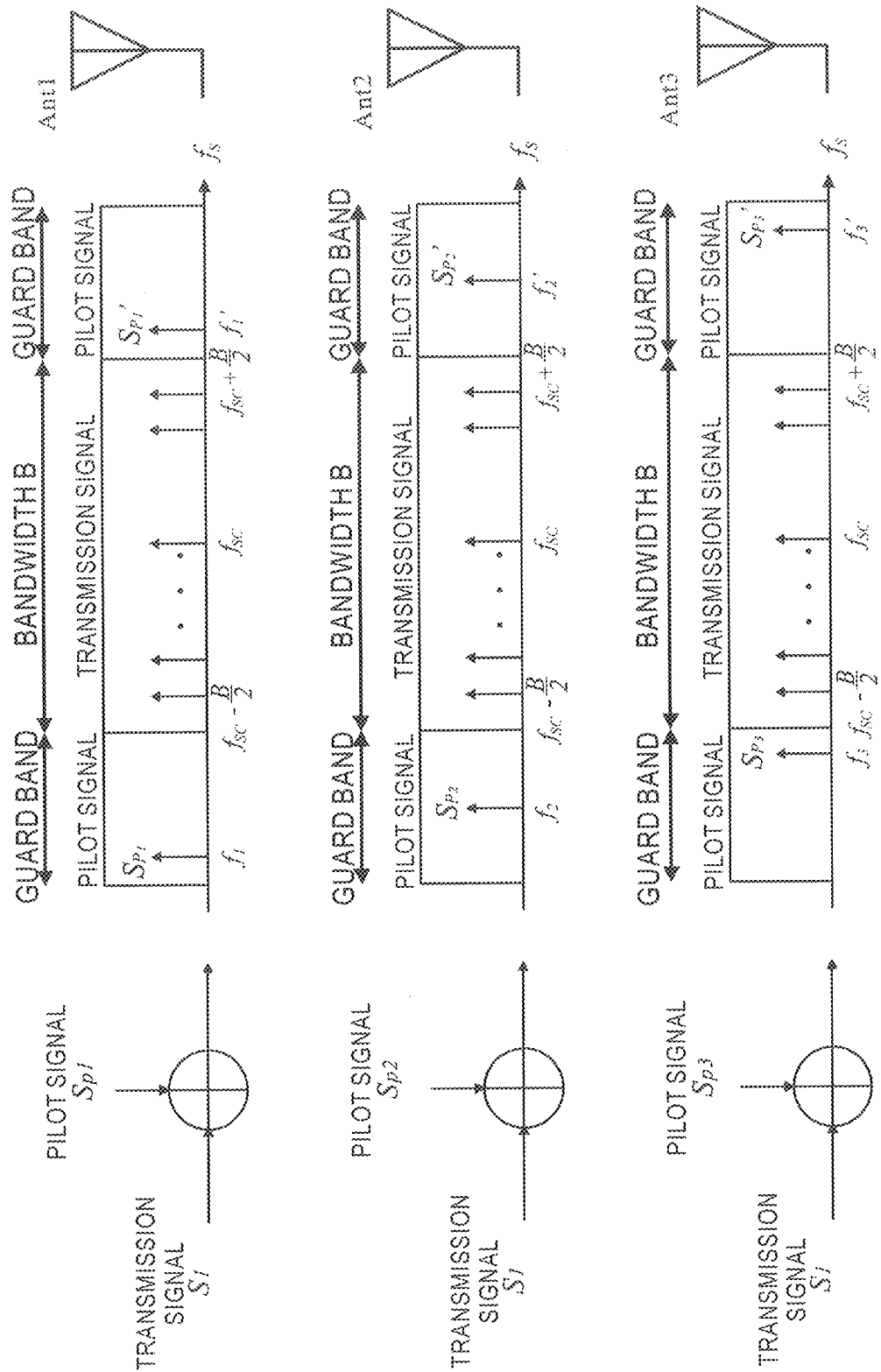
FIG. 12 is an illustration showing an example of a pilot signal in a transmission signal band of a downlink transmitted from each FL antenna of HAPS.

In the present calculation method, as shown in FIG. 12, pilot signals $S_{Pi}$ (i=1 to 3) having frequencies different from each other, which are arranged in the guard bands outside the transmission signal band FB, are transmitted from each transmitter of the HAPS 20 to the GW stations 70(1) to 70(3) via each of the FL antennas 211(1) to 211(3).

Figure 13:
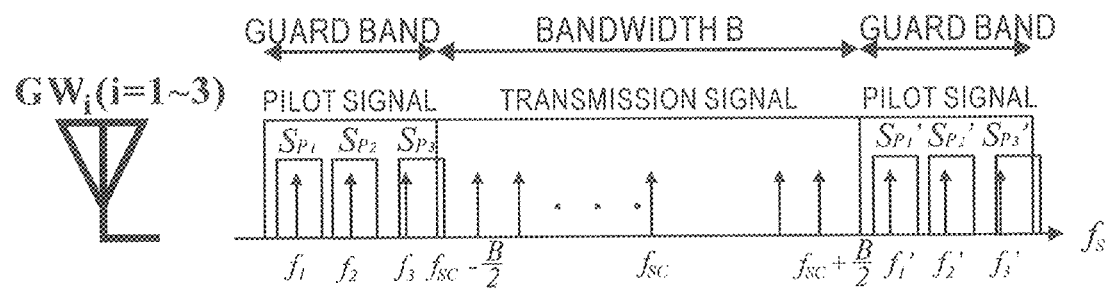
FIG. 13 is an illustration showing an example of a pilot signal in a reception signal band of a downlink received by each GW station.

As shown in FIG. 13, since the band of the pilot signal $S_{Pi}$ is a narrow band, the plural pilot signals having frequencies different from each other can be arranged and transmitted from each transmitter of the HAPS at frequencies outside the transmission signal band FB. Further, since each pilot signal $S_{Pi}$ has a different frequency from each other, the pilot signal can be correctly received without any interference. That is, each pilot signal $S_{Pi}$ is orthogonal to each other on the frequency axis.

Figure 14:
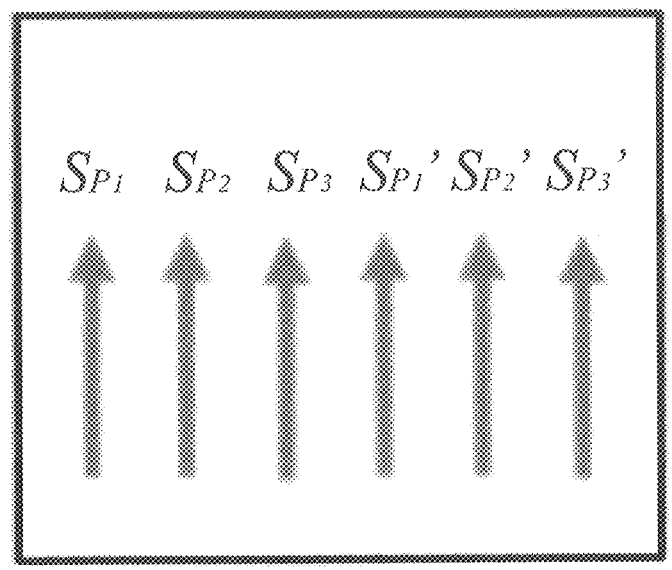
FIG. 14 is an illustration showing an example of a pilot signal separated with a filter and used for deriving a propagation path response.

Next, each of the GW station 70(1) to 70(3) separates each of the pilot signal $S_{Pi}$ (i=1 to 3) from the reception signal by using a filter 712 (see FIG. 14), and obtains a propagation path response hki from the FL antenna 211(*i*) of the i-th transmitter of the HAPS 20 to the k-th GW station 70(*k*), from the separated pilot signal $S_{Pi}$. Each of the GW station 70(1) to 70(3) transfers information on the obtained propagation path response hki (see the following equations (4) and (5)) to the interference canceller section 220 via the transmitter/receiver of the HAPS 20 as feedback information using an uplink control signal.

$$P_{ki} = h_{ki} S_{pi} \quad (4)$$

$$h_{ki} = \frac{P_{ki}}{S_{pi}} \quad (5)$$

Next, the interference canceller section 220 of the HAPS 20 obtains a downlink-propagation path response matrix $H_P$ (see the following equation (7)) of the pilot signal $S_{pi}$, based on a downlink-propagation path response $h_{ki}$ (see the following equation (6)) of each GW station 70(1) to 70(3) transferred by the uplink control signal.

$$\begin{bmatrix} h_{11} & h_{12} & h_{13} \\ h_{21} & h_{22} & h_{23} \\ h_{31} & h_{32} & h_{33} \end{bmatrix} \quad (6)$$

$$\begin{aligned}
H_p &= \begin{bmatrix} h_{11}(f_{P1}) & h_{12}(f_{P2}) & h_{13}(f_{P3}) \\ h_{21}(f_{P1}) & h_{22}(f_{P2}) & h_{23}(f_{P3}) \\ h_{31}(f_{P1}) & h_{32}(f_{P2}) & h_{33}(f_{P3}) \end{bmatrix} \\
&= \begin{bmatrix} |h_{11}(f_{P1})|e^{j\theta_{11}} & |h_{12}(f_{P2})|e^{j\theta_{12}} & |h_{13}(f_{P3})|e^{j\theta_{13}} \\ |h_{21}(f_{P1})|e^{j\theta_{21}} & |h_{22}(f_{P2})|e^{j\theta_{22}} & |h_{23}(f_{P3})|e^{j\theta_{23}} \\ |h_{31}(f_{P1})|e^{j\theta_{31}} & |h_{32}(f_{P2})|e^{j\theta_{32}} & |h_{33}(f_{P3})|e^{j\theta_{33}} \end{bmatrix} \\
&= \begin{bmatrix} |h_{11}(f_{P1})| & |h_{12}(f_{P2})|e^{j2\pi f_{P2}\frac{\Delta d_{12}}{c}} & |h_{13}(f_{P3})|e^{j2\pi f_{P3}\frac{\Delta d_{13}}{c}} \\ |h_{21}(f_{P1})|e^{j2\pi f_{P1}\frac{\Delta d_{21}}{c}} & |h_{22}(f_{P2})| & |h_{23}(f_{P3})|e^{j2\pi f_{P3}\frac{\Delta d_{23}}{c}} \\ |h_{31}(f_{P1})|e^{j2\pi f_{P1}\frac{\Delta d_{31}}{c}} & |h_{32}(f_{P2})|e^{j2\pi f_{P2}\frac{\Delta d_{32}}{c}} & |h_{33}(f_{P3})| \end{bmatrix} \\
&\quad \begin{bmatrix} e^{j2\pi f_{p1}\frac{d_{11}}{c}} & 0 & 0 \\ 0 & e^{j2\pi f_{p2}\frac{d_{22}}{c}} & 0 \\ 0 & 0 & e^{j2\pi f_{p3}\frac{d_{33}}{c}} \end{bmatrix}
\end{aligned} \quad (7)$$

The interference canceller section 220 of the HAPS 20 estimates a propagation path response matrix H ($f_d$) of an arbitrary frequency $f_d$ in the transmission signal band FB (see the following equation (8)), based on the propagation path response matrix $H_P$ of the pilot signal $S_{Pi}$ (see equation (7) above).

$$H(f_d) \approx \begin{bmatrix} |h_{11}(f_d)| & |h_{12}(f_d)|e^{j2\pi f_d \frac{\Delta d_{12}}{c}} & |h_{13}(f_d)|e^{j2\pi f_d \frac{\Delta d_{13}}{c}} \\ |h_{21}(f_d)|e^{j2\pi f_d \frac{\Delta d_{21}}{c}} & |h_{22}(f_d)| & |h_{23}(f_d)|e^{j2\pi f_d \frac{\Delta d_{23}}{c}} \\ |h_{31}(f_d)|e^{j2\pi f_d \frac{\Delta d_{31}}{c}} & |h_{32}(f_d)|e^{j2\pi f_d \frac{\Delta d_{32}}{c}} & |h_{33}(f_d)| \end{bmatrix} \quad (8)$$

Herein, $\Delta d_{ki}$ (k=1 to 3, i=1 to 3) in the above equation (8) is a difference in path length (path difference) between the i-th FL antenna 211(*i*) on the transmitting side and the GW antenna 71(*k*) of the k-th GW station 70(*k*) on the receiving side in the downlink. If the number k (=i) of the GW antenna 71 of the GW station 70, which is the most face-to-face with the i-th FL antenna 211(*i*), is expressed as i for convenience, when the path length of the interference signal between the k-th GW antenna 71(*k*) and the i (≠k)-th FL antenna 211(*i*) is $d_{ki}$ with reference to the path length $d_{ii}$ of the desired signal between the i-th GW antenna 71(*i*) and the i-th FL antenna 211(*i*) that is the most face-to-face with the i-th GW antenna 71(*i*), the $\Delta d_{ki}$ is a difference (path difference) between the path length $d_{ii}$ of the desired signal and the path length $d_{ki}$ of the interference signal with reference to the path length $d_{ii}$ of the desired signal. For example, with reference to the path length $d_{11}$ between the first GW antenna 71(1) and the first FL antenna 211(1) that is the most face-to-face with the first GW antenna 71(1), $\Delta d_{12}$ is a difference (path difference) between the reference path length $d_{11}$ and the path length $d_{12}$ between the first GW antenna 71(1) and the second FL antenna 211(2). Further, with reference to the path length $d_{22}$ between the second GW antenna 71(2) and the second FL antenna 211(2) that is the most face-to-face with the second GW antenna 71(2), $\Delta d_{21}$ is a difference (path difference) between the reference path length $d_{22}$ and the path length $d_{21}$ between the second GW antenna 71(2) and the first FL antenna 211(1).

The foregoing $\Delta d_{ki}$ can be expressed by the phase difference $\Delta \theta_{ki}$ between the propagation path response $h_{ki}$ of the interference signal and the propagation path response $h_{ii}$ of the desired signal as in the following equation (9).

$$\Delta d_{ki} = \frac{c}{2\pi(f'_{Pi} - f_{Pi})}(\Delta\theta'_{ki} - \Delta\theta_{ki}) \quad (9)$$

In the above equation (9), $\Delta\theta_{ki}$ is a phase difference between $h_{ki}$ and $h_{ii}$ of the propagation path response, and $\Delta\theta'_{ki}$ is a phase difference between $h'_{ki}$ and $h'_{ii}$ of the propagation path response (see the following equations (10) and (11)).

$$\Delta\theta_{ki} = \theta_{ki} - \theta_{ii} \quad (10)$$
$$= \mathrm{Arg}\left(\frac{h_{ki}}{h_{ii}}\right)$$

$$\Delta\theta'_{ki} = \theta'_{ki} - \theta'_{ii} \quad (11)$$
$$= \mathrm{Arg}\left(\frac{h'_{ki}}{h'_{ii}}\right)$$

Further, as exemplified in the following equation (12), it is assumed that the propagation path response $h_{ki}(f_{Pi})$ at the frequency $f_{Pi}$ of the pilot signal $S_{Pi}$ arranged in the guard band and the propagation path response $h_{ki}(f_d)$ at the frequency $f_d$ in the transmission signal band FB are equivalent to each other.

$$|h_{11}(f_{p1})| \approx |h_{11}(f_d)|, |h_{12}(f_{p1})| \approx |h_{12}(f_d)|, |h_{13}(f_{p1})| \approx |h_{13}(f_d)|$$

$$|h_{21}(f_{p1})| \approx |h_{21}(f_d)|, |h_{22}(f_{p1})| \approx |h_{22}(f_d)|, |h_{23}(f_{p1})| \approx |h_{23}(f_d)|$$

$$|h_{31}(f_{p1})| \approx |h_{31}(f_d)|, |h_{32}(f_{p1})| \approx |h_{32}(f_d)|, |h_{33}(f_{p1})| \approx |h_{33}(f_d)| \quad (12)$$

The interference canceller section 220 of the HAPS 20 calculates a transmission weight $W(f_d)$ to be applied to a transmission signal having the frequency $f_d$ in the transmission signal band FB transmitted from each of the FL antennas 211(1) to 211(3), based on the estimation result of the propagation path response $H(f_d)$ of the frequency $f_d$ in the transmission signal band FB represented by the above equation (8). For example, in the ZF (Zero-Forcing) method, a weight $W_{ZF}(f_d)$ can be obtained by the inverse matrix of the propagation path response matrix $H(f_d)$ as in the following equation (13).

$$W_{ZF}(f_d) = H^{-1}(f_d) = [w_1(f_d), w_2(f_d), w_3(f_d)] \quad (13)$$

When applying to actual communications, with respect to the weight $W_{ZF}(f_d)$ obtained by the above ZF method, a transmission weight $W(f_d)$ of the following equation (14), which is normalized so as to have a relative power of 1 in order not to increase the transmission power, may be used.

$$W(f_d) = \left[\frac{w_1(f_d)}{\|w_1(f_d)\|}, \frac{w_2(f_d)}{\|w_2(f_d)\|}, \frac{w_3(f_d)}{\|w_3(f_d)\|}\right] \quad (14)$$
$$= [w_1(f_d), w_2(f_d), w_3(f_d)]$$
$$\begin{bmatrix} 1/\|w_1(f_d)\| & 0 & 0 \\ 0 & 1/\|w_2(f_d)\| & 0 \\ 0 & 0 & 1/\|w_3(f_d)\| \end{bmatrix} (\|\ \|: norm)$$

When the transmission signal having the frequency $f_d$ in the transmission signal band FB is multiplied by the transmission weight $W(f_d)$ and transmitted from each of the FL antennas 211(1) to 211(3), a reception signal at the GW stations 70(1) to 70(3) is, for example, the following equation (15). In the equation (15), $S_d$ is a transmission signal (desired signal) transmitted from the HAPS 20 to the GW station 70 at a frequency $f_d$ in the transmission signal band FB, and N is noise.

$$Y = H(f_d)(W(f_d)S_d) + N \quad (15)$$
$$= H(f_d)(H(f_d)^{-1}S_p) + N$$
$$= \begin{bmatrix} 1/\|w_1(f_d)\| & 0 & 0 \\ 0 & 1/\|w_2(f_d)\| & 0 \\ 0 & 0 & 1/\|w_3(f_d)\| \end{bmatrix} S_d + N$$
$$\approx \begin{bmatrix} S_{d1}/\|w_1(f_d)\| \\ S_{d2}/\|w_2(f_d)\| \\ S_{d3}/\|w_3(f_d)\| \end{bmatrix} (S_d \gg N)$$

As exemplified in the above equation (15), in the reception signal Y received by each of the GW stations 70(1) to 70(3) in the reverse link of the multi-feeder link with the HAPS 20, interference from transmitters (FL antennas) other than the corresponding transmitter (FL antenna) of the HAPS 20 can be canceled.

[Calculation Method of Transmission Weight W Using Uplink Pilot Signal]

Next, it is described of a case of using an uplink pilot signal.

In the present calculation method, each of the GW stations 70(1) to 70(3) transmits pilot signals $S_{Pi}$ and $S_{Pi}'$. Since a line for transmitting the pilot signals $S_{Pi}$ and $S_{Pi}'$ is the uplink (forward link) in the opposite direction to the downlink (reverse link) for transmitting the transmission signal from the HAPS 20, the pilot signals $S_{Pi}$ and $S_{Pi}'$ may be arranged in the transmission signal band FB of the reverse link.

The interference canceller section 220 of the HAPS 20 receives the pilot signals $S_{Pi}$ and $S_{Pi}'$ of the uplink (forward link) transmitted from each of the GW stations 70(1) to 70(3), and obtains a propagation path response matrix of the uplink pilot signals based on the reception results of the uplink pilot signals $S_{Pi}$ and $S_{Pi}'$ by a propagation path model considering a free space transmission. Further, the interference canceller section 220 estimates a propagation path response matrix of the transmission signals in the transmission signal band FB of the downlink (reverse link) by using the propagation path response matrix of the uplink pilot signals.

Since each of the propagation path response matrix $H_P$ by the uplink pilot signal $S_{Pi}$, the propagation path response matrix $H(f_d)$ of the frequency $f_d$ of the downlink transmission signal band estimated based on the uplink pilot signal, the weight $W_{ZF}(f_d)$ obtained by the ZF method, the normalized transmission weight $W(f_d)$ and the reception signal at the GW station 70 is the same as those of the above-mentioned equations (7), (8), (13), (14) and (15), their description is omitted.

Also when calculating the transmission weight W using the uplink pilot signal, in the reception signal Y received by each of the GW stations 70(1) to 70(3) in the reverse link of the multi-feeder link with the HAPS 20, interference from transmitters (FL antennas) other than the corresponding transmitter (FL antenna) of the HAPS 20 can be canceled.

As described above, the configuration using the interference canceller section 220, which is provided in the HAPS 20 for transmitting signals of the reverse link that is the downlink of the feeder link, simplifies the system configuration, since the distance between the transmitters that transmit signals to which the transmission weight W is applied is short (several meters), the configuration is a transmission interference canceller that multiplies the transmission signal of each transmitter on the HAPS 20 by the transmission weight (W) to suppress interference from other transmitters of the reception signal of each GW station 70, and the receiver on the GW station side, which is far from the receiver (50 to 100 km), does not perform an interference cancellation processing.

Especially, in the calculation method of the transmission weight W of the downlink (reverse link) using the pilot signal of the uplink (forward link), it is not necessary to insert the pilot signal outside the transmission band in order to estimate the propagation path response matrix on the downlink, and the system configuration is further simplified.

It is noted that, the interference canceller section 220 provided in the HAPS 20 may have a band-division transmission interference canceller function, which divides the transmission signal band FB that transmits the transmission signal to each GW station 70 into N (for example, divided into two or three) on the frequency axis and uses the weights $W_{1,ij}$ to $W_{N,ij}$ calculated for each of the division bands.

The weight W for each divided band is calculated, for example, as follows.

For example, in case of using the downlink (reverse link) pilot signal, each of the plural GW stations 70 receives plural pilot signals transmitted from the relay communication station 21 of the HAPS 20, and separates each of the received plural pilot signals with a filter.

Next, each of the plural GW stations 70 divides the transmission signal band FB of the feeder link into plural divided bands FB(1) to FB(N), estimates the propagation path responses between the GW station 70 and the FL antennas 211(1) to 211(3) of the HAPS 20 for each of the plural divided bands FB(1) to FB(N), with the center frequency of each of the plural divided bands FB(1) to FB(N) as the estimated frequency, based on the reception results of the pilot signals received from the relay communication station 21 and separated, and transmits the estimation results of the propagation path responses to the relay communication station 21 of the HAPS 20.

Next, the relay communication station 21 of the HAPS 20 receives the estimation result of the propagation path response of each of the plural divided bands FB(1) to FB(N) transmitted from each of the plural GW stations 70(1) to 70(3).

Next, the interference canceller section 220 provided in the relay communication station 21 of the HAPS 20 calculates, with respect to each of the plural GW stations 70(1) to 70(3), for each of the divided bands, weights $W_{1,ij}$ to $W_{N,ij}$ for suppressing an interference signal that causes an interference by the transmission signal transmitted from the relay communication station 21 to the GW station 70 and received by another GW station, based on the propagation path response of each of the plural divided bands FB(1) to FB(N) received from each of the plural GW stations 70(1) to 70(3).

On the other hand, in case of using the uplink (forward link) pilot signal, first, the relay communication station 21 of the HAPS 20 receives plural pilot signals having frequencies different from each other transmitted from each of the plural GW stations 70(1) to 70(3), and separates each of the received plural pilot signals with a filter.

Next, the interference canceller section 220 of the relay communication station 21 divides the transmission signal band FB of the feeder link into plural divided bands FB(1) to FB(N), estimates the propagation path response between each of the plural GW stations 70(1) to 70(3) and the FL antennas 211(1) to 211(3) of the HAPS 20 for each of the plural divided bands FB(1) to FB(N), with the center frequency of each of the plural divided band FB(1) to FB(N) as the estimated frequency, based on the reception results of plural pilot signals received from each of the plural GW stations 70(1) to 70(3) and separated.

Next, the interference canceller section 220 calculates, with respect to each of the plural GW stations 70(1) to 70(3), for each of the divided bands, weights $W_{1,ij}$ to $W_{N,ij}$ for suppressing an interference signal that causes an interference by the transmission signal transmitted from the HAPS 20 to the GW station 70 and received by another GW station 70, based on the propagation path response of each of the plural divided bands FB(1) to FB(N).

Figure 15:
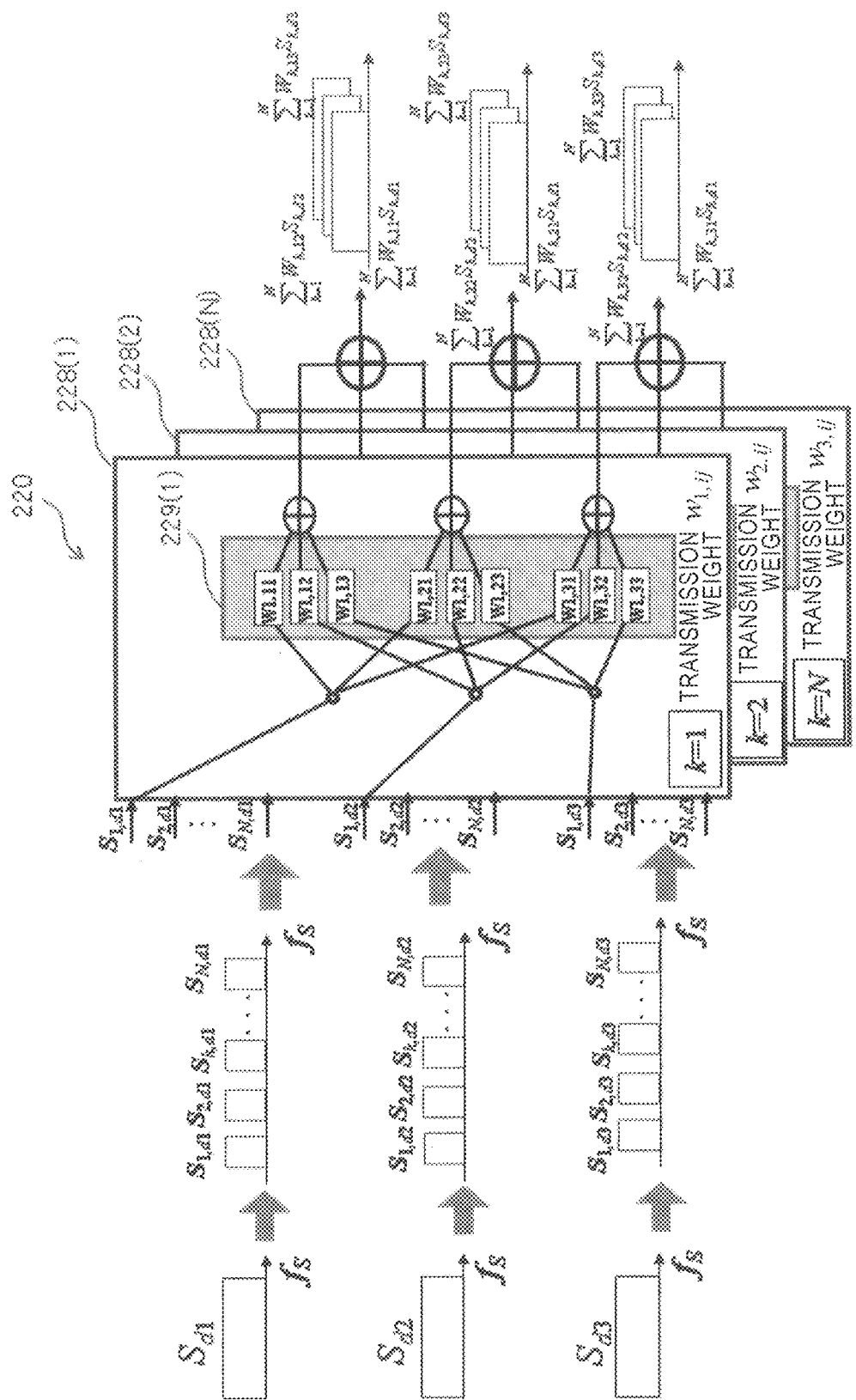
FIG. 15 is an illustration showing an example of a schematic configuration of an interference canceller section of a reverse link provided on HAPS side (transmission side) in a multi-feeder link of plural GW systems according to yet another embodiment.

FIG. 15 is an illustration showing an example of a schematic configuration of an interference canceller section 220 of the reverse link provided on the HAPS side (transmission side) in the multi-feeder link of the plural GW systems according to yet another embodiment. The interference canceller section 220 in FIG. 15 is provided with plural band-division transmission cancellers 228(1) to 228(N) corresponding to the plural division bands FB(1) to FB(N). Each of the plural band-divided transmission cancellers 228(1) to 228(N) is provided with divided-transmission signal processing sections 229(1) to 229(N), which respectively process a transmission signal using the weights $W_{1,ij}$ to $W_{N,ij}$ calculated for plural divided bands FB(1) to FB(N).

In FIG. 15, each of the transmission signals $S_{d1}$ to $S_{d3}$ transmitted to each of the GW stations 70(1) to 70(3) is divided into N (for example, divided into two or three) on the frequency axis, divided transmission signals $S_{1,d1}$ to $S_{N,d1}$, $S_{1,d2}$ to $S_{N,d2}$ and $S_{1,d3}$ to $S_{N,d3}$ corresponding to the plural divided bands FB(1) to FB(N) are generated, and inputted to the interference canceller section 220.

In the interference canceller section 220, the divided transmission signals $S_{1,d1}$ to $S_{N,d1}$, $S_{1,d2}$ to $S_{N,d2}$ and $S_{1,d3}$ to $S_N$ are respectively processed by the band-divided transmission cancellers 228(1) to 228(N), for each of the divided bands.

For example, the divided-transmission signal processing section 229(1) of the band-divided transmission canceller 228(1) corresponding to the divided band FB(1) generates the divided transmission signals $S'_{1,d1}$, $S'_{1,d2}$ and $S'_{1,d3}$ after the interference suppression using the weights $W_{1,ij}$, with respect to the divided transmission signals $S_{1,d1}$, $S_{1,d2}$ and $S_{1,d3}$ before the interference suppression, which are divided into the division band FB(1). For example, the divided-transmission signal processing section 229(1) uses the weight $W_{1,11}$, $W_{1,12}$, $W_{1,13}$ to generate the divided transmission signals $S'_{1,d1}$ (=$W_{1,11}$, $S_{1,d1}$+$W_{1,12}S_{1,d2}$+$W_{1,13}S_{1,d3}$) after the interference suppression of the divided band FB, with respect to the transmission signal of the divided band FB(1) to be transmitted to the first GW station 70(1). Similarly, the divided-transmission signal processing section 229(1) generates the divided transmission signals $S'_{1,d2}$ (=$W_{1,21}$, $S_{1,d1}$+$W_{1,22}S_{1,d2}$+$W_{1,23}S_{1,d3}$) after the interference suppression of the divided band FB(1), which is transmitted to the second GW station 70(2), and generates the divided transmission signals $S'_{1,d3}$ (=$W_{1,31}$, $S_{1,d1}$+$W_{1,32}S_{1,d2}$+$W_{1,33}S_{1,d3}$) after the interference suppression of the divided band FB(1), which are transmitted to the third GW station 70(3).

Similarly, the divided-transmission signal processing section 229(2) of the band-divided transmission canceller 228(2) corresponding to the divided band FB(2) generates the divided transmission signals $S'_{2,d1}$ (=$W_{2,11}$, $S_{2,d1}$+$W_{2,12}$ $S_{2,d2}+W_{2,13}S_{2,d3}$) after the interference suppression of the divided band FB(2), which are transmitted to the first GW station 70(1), the divided transmission signals $S'_{2,d2}$ (=$W_{2,21}$, $S_{1,d1}+W_{2,22}S_{2,d2}+W_{2,23}S_{2,d3}$) after the interference suppression of the divided band FB(2), which is transmitted to the second GW station 70(2), and the divided transmission signals $S'_{2,d3}$ (=$W_{2,31}$, $S_{2,d1}+W_{2,32}S_{2,d2}+W_{2,33}S_{2,d3}$) after the interference suppression of the divided band FB(2), which are transmitted to the third GW station 70(3).

Also, similarly, the divided-transmission signal processing section 229(N) of the band-divided transmission canceller 228(N) corresponding to the divided band FB(N) generates the divided transmission signals $S'_{N,d1}$ (=$W_{N,11}$, $S_{N,d1}+W_{N,12}S_{N,d2}+W_{N,13}S_{N,d3}$) after the interference suppression of the divided band FB(N), which are transmitted to the first GW station 70(1), the divided transmission signals $S'_{N,d2}$ (=$W_{N,21}$, $S_{1,d1}+W_{N,22}S_{2,d2}+W_{N,23}S_{N,d3}$) after the interference suppression of the divided band FB(N), which are transmitted to the second GW station 70(2), and the divided transmission signals $S'_{N,d3}$ (=$W_{N,31}$, $S_{3,d1}+W_{N,32}S_{N,d2}+W_{N,33}S_{N,d3}$) after the interference suppression of the divided band FB(N), which are transmitted to the third GW station 70(3).

The interference canceller section 220 synthesizes the divided transmission signals $S'_{1,d1}$, $S'_{1,d2}$, $S'_{1,d3}$, $S'_{2,d1}$, $S'_{2,d2}$, $S'_{2,d3}$, $S'_{N,d1}$, $S'_{N,d2}$, $S'_{N,d3}$ after the interference suppression, which are outputted from the divided-transmission signal processing sections 229(1) to 229(N) for each of the divided bands, and generates the transmission signals $S'_{d1}$, $S'_{d2}$, $S'_{d3}$ after the interference suppression for each of the GW stations 70(1) to 70(3) as shown in the following equations (16) to (18).

$$S'_{d1} = \sum_{k=1}^{N} W_{k,11}S_{k,d1} + \sum_{k=1}^{N} W_{k,12}S_{k,d2} + \sum_{k=1}^{N} W_{k,13}S_{k,d3} \quad (16)$$

$$S'_{d2} = \sum_{k=1}^{N} W_{k,21}S_{k,d1} + \sum_{k=1}^{N} W_{k,22}S_{k,d2} + \sum_{k=1}^{N} W_{k,23}S_{k,d3} \quad (17)$$

$$S'_{d3} = \sum_{k=1}^{N} W_{k,31}S_{k,d1} + \sum_{k=1}^{N} W_{k,32}S_{k,d2} + \sum_{k=1}^{N} W_{k,33}S_{k,d3} \quad (18)$$

Figure 16:
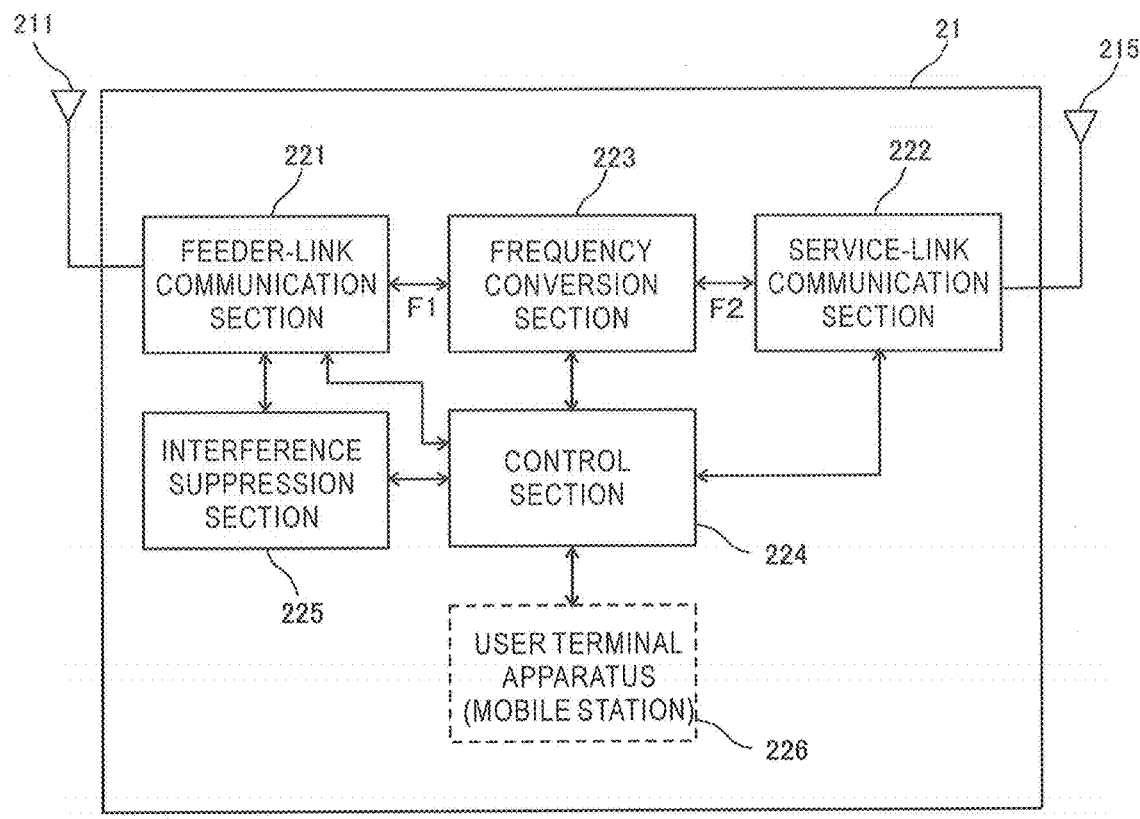
FIG. 16 is an illustration showing an example of a main configuration of a relay communication station of HAPS according to the embodiment.

FIG. 16 is an illustration showing an example of a main configuration of the relay communication station 21 of the HAPS 20 according to the embodiment. In FIG. 16, the relay communication station 21 is provided with a feeder-link communication section 221, a service-link communication section 222, a frequency conversion section 223, a control section 224 that controls each section, and an interference suppression section 225.

The feeder-link communication section 221 transmits and receives radio signals of a first frequency F1 for feeder link to and from the GW station 70 via the FL antenna 211. Further, the feeder-link communication section 221 receives plural pilot signals transmitted from each of the plural GW stations 70(1) to 70(3), and separates each of the received plural pilot signals by the filter. The service-link communication section 222 transmits and receives radio signals of a second frequency F2 for the service link to and from the terminal apparatus 61 via an antenna for service link 115. The frequency conversion section 223 performs a frequency conversion between the first frequency F1 and the second frequency F2 between the feeder-link communication section 221 and the service-link communication section 222.

The radio signals relayed by the relay communication station 21 may be transmitted and received, for example, by using the OFMDA communication method conforming to the standard specifications of the LTE or LTE-Advanced. In this case, it is capable of maintaining good communication quality even when occurring multipaths of radio signals with different delays.

The control section 224 can control each section by executing a pre-installed program.

The interference suppression section 225 corresponds to the interference canceller section 220 described above, and performs the aforementioned process for suppressing the interference of the reverse link between the plural feeder links that is formed between the plural GW stations 70(1) to 70(3) and the HAPS, as exemplified in the following (1) to (3) by executing a pre-installed program.
(1) Estimation of the plural propagation path responses based on the reception results of plural pilot signals.
(2) Calculation of a weight W based on the plural propagation path responses.
(3) With respect to each of the plural GW stations 70(1) to 70(3), signal processing to add or subtract for a transmission signal to the GW station by multiplying the transmission signal corresponding to another GW station by the weight W corresponding to the other GW station.

It is noted that, when receiving control information from the remote control apparatus (control source) of the communication operator of the mobile communication network or transmitting information to the remote control apparatus, a user terminal (mobile station) 226 connected to the control section 224 may be provided. The control section 224, for example, may receive the control information transmitted from the remote control apparatus by the user terminal (mobile station) 226 and control each section based on the control information. Herein, the communication between the remote control apparatus and the user terminal (mobile station) 226 may be performed using, for example, the IP address (or telephone number) assigned to each of the remote control apparatus and the user terminal (mobile station) 226.

As described above, according to the present embodiment, it is possible to dynamically suppress the interference in the reverse link of the multi-feeder link of the same frequency between the HAPS 20 and the plural GW stations 70(1) to 70(3).

In particular, according to the present embodiment, by transmitting the plural pilot signals $S_{P1}$, $S_{P2}$, $S_{P3}$, $S_{P1}'$, $S_{P2}'$, $S_{P3}'$ having frequencies different from each other from each of the plural GW stations 70(1) to 70(3), the path difference between the HAPS 20 and the plural GW stations 70(1) to 70(3) required for the dynamic suppression of the interference in the reverse link of the multi-feeder link can be estimated and grasped, up to the range required for implementing, so that the interference in the reverse link of the multi-feeder link can be suppressed accurately.

Further, according to the present embodiment, it is possible to improve the frequency utilization efficiency of the feeder link while suppressing the decrease in the SINR of the reverse link of the feeder link of the HAPS 20.

It is noted that, the process steps and configuration elements of the relay communication station of the communication relay apparatus such as the HAPS, the feeder station, the gateway station, the management apparatus, the monitoring apparatus, the remote control apparatus, the server, the terminal apparatus (user apparatus, mobile station, communication terminal), the base station and the base station apparatus described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, radio relay station, feeder station, gateway station, base station, base station apparatus, radio-relay station apparatus, terminal apparatus (user apparatus, mobile station, communication terminal), management apparatus, monitoring apparatus, remote control apparatus, server, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, an electronic device, other electronic unit, computer, or a combination thereof, which are designed so as to perform a function described in the present specification.

With respect to the firmware and/or software implementation, means such as processing units or the like used for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The medium may be a non-transitory recording medium. Further, the code of the program may be executable by being read by a computer, a processor, or another device or an apparatus machine, and the format is not limited to a specific format. For example, the code of the program may be any of a source code, an object code, and a binary code, and may be a mixture of two or more of those codes.

The description of embodiments disclosed in the present specification is provided so that the present disclosures can be produced or used by those skilled in the art. Various modifications of the present disclosures are readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

20 HAPS (communication relay apparatus)
21 relay communication station
61 terminal apparatus
70, 70(1) to 70(3) gate way station (GW station)
71, 71(1) to 71(3) antenna for feeder link (GW antenna)
200C, 200C(1) to 200C(7) three dimensional cell
200F, 200F(1) to 200F(7) foot print
211, 211(1) to 211(3) antenna for feeder link (FL antenna)
212, 212(1) to 212(3) antenna directional beam
215 antenna for service link (SL antenna)
220 interference canceller section
228(1) to 228(N) band-divided transmission canceller
229(1) to 229(N) divided-transmission signal processing section
720 interference canceller section

The invention claimed is:

1. A system comprising an aerial-staying type communication relay apparatus including a relay communication station that relays a radio communication of a terminal apparatus, comprising plural gateway stations that are time-synchronized with each other and transmit and receive relay signals different from each other on a same frequency in a feeder link to and from the relay communication station of the aerial-staying type communication relay apparatus, and
wherein the relay communication station comprises a feeder-link communication section that transmits and receives relay signals different from each other on a same frequency in the feeder link to and from the plural gateway stations, and an interference suppression section that suppresses an interference between plural feeder links formed with the plural gateway stations,
wherein the feeder-link communication section of the relay communication station transmits plural pilot signals having frequencies different from each other, to each of the plural gateway stations, in order to estimate plural propagation path responses between the gateway station and an antenna for feeder link of the communication relay apparatus in a transmission signal band of the feeder link,
wherein each of the plural gateway stations receives the plural pilot signals for estimating the plural propagation path responses, the plural pilot signals being transmitted from the relay communication station,
wherein any one gateway station of the plural gateway stations or a common apparatus common to each gateway station:
estimates the plural propagation path responses between the gateway station and the antenna for feeder link of the communication relay apparatus in the transmission signal band of the feeder link, based on reception results of the plural pilot signals; and
transmits estimation results of the propagation path responses to the relay communication station;
wherein the feeder-link communication section of the relay communication station receives the plural propagation path responses transmitted from the any one gateway station or the common apparatus, and
wherein the interference suppression section of the relay communication station:
calculates a weight for suppressing an interference signal that causes an interference by a transmission signal transmitted from the relay communication station to the gateway station and received by another gateway station, based on the plural propagation path responses, with respect to each of the plural gateway station; and adds or subtracts, for the transmission signal to be transmitted to the gateway station, a transmission signal to be transmitted to another gateway station that is multiplied by the weight corresponding to the other gateway station, with respect to each of the plural gateway station, wherein each of the plural gateway stations:
receives the plural pilot signals transmitted from the relay communication station, and separates each of the received plural pilot signals with a filter;

divides the transmission signal band of the feeder link into plural divided bands, and estimates a propagation path response between the gateway station and the antenna for feeder link of the communication relay apparatus in the transmission signal band of the feeder link for each of the plural divided bands, with a center frequency of each of the plural divided bands as an estimated frequency, based on the reception result of the pilot signal received from the relay communication station and separated; and transmits the estimation result of the propagation path response of each of the plural divided bands, to the relay communication station, wherein the feeder-link communication section of the relay communication station receives the estimation result of the propagation path response of each of the plural divided bands transmitted from each of the plural gateway stations, wherein the interference suppression section of the relay communication station:
calculates a weight for suppressing an interference signal that causes an interference by a transmission signal transmitted from the relay communication station to the gateway station and received by another gateway station, based on the propagation path response of each of the plural divided bands received from each of the plural gateway stations, for each of the divided bands with respect to each of the plural gateway stations; and generates a divided transmission signal by adding or subtracting, for the transmission signal to be transmitted to the gateway station, a transmission signal to be transmitted to another gateway station that is multiplied by the weight corresponding to the other gateway station, for each of the divided bands with respect to each of the plural gateway stations, and generates a transmission signal by synthesizing the divided transmission signals of the plural divided bands.

2. A system comprising an aerial-staying type communication relay apparatus including a relay communication station that relays a radio communication of a terminal apparatus, comprising plural gateway stations that are time-synchronized with each other and transmit and receive relay signals different from each other on a same frequency in a feeder link to and from the relay communication station of the aerial-staying type communication relay apparatus, and wherein the relay communication station comprises a feeder-link communication section that transmits and receives relay signals different from each other on a same frequency in the feeder link to and from the plural gateway stations, and an interference suppression section that suppresses an interference between plural feeder links formed with the plural gateway stations, wherein the feeder-link communication section of the relay communication station transmits plural pilot signals having frequencies different from each other, to each of the plural gateway stations, in order to estimate plural propagation path responses between the gateway station and an antenna for feeder link of the communication relay apparatus in a transmission signal band of the feeder link, wherein each of the plural gateway stations:
receives the plural pilot signals for estimating the plural propagation path responses, the plural pilot signals being transmitted from the relay communication station; and transmits reception results of the plural pilot signals to the relay communication station, wherein the feeder-link communication section of the relay communication station receives the reception results of the plural pilot signals transmitted from each of the plural gateway stations, wherein the interference suppression section of the relay communication station:
estimates the plural propagation path responses between the gateway station and the antenna for feeder link of the communication relay apparatus in the transmission signal band of the feeder link, based on the reception results of the plural pilot signals received from each of the plural gateway stations;

calculates a weight for suppressing an interference signal that causes an interference by a transmission signal transmitted from the relay communication station to the gateway station and received by another gateway station, based on the estimation results of the plural propagation path responses, with respect to each of the plural gateway station; and adds or subtracts, for the transmission signal to be transmitted to the gateway station, a transmission signal to be transmitted to another gateway station that is multiplied by the weight corresponding to the other gateway station, with respect to each of the plural gateway station, wherein each of the plural gateway stations:
receives the plural pilot signals transmitted from the relay communication station, and separates each of the received plural pilot signals with a filter;

divides the transmission signal band of the feeder link into plural divided bands, and estimates a propagation path response between the gateway station and the antenna for feeder link of the communication relay apparatus in the transmission signal band of the feeder link for each of the plural divided bands, with a center frequency of each of the plural divided bands as an estimated frequency, based on the reception result of the pilot signal received from the relay communication station and separated; and transmits the estimation result of the propagation path response of each of the plural divided bands, to the relay communication station, wherein the feeder-link communication section of the relay communication station receives the estimation result of the propagation path response of each of the plural divided bands transmitted from each of the plural gateway stations, wherein the interference suppression section of the relay communication station:
calculates a weight for suppressing an interference signal that causes an interference by a transmission signal transmitted from the relay communication station to the gateway station and received by another gateway station, based on the propagation path response of each of the plural divided bands received from each of the plural gateway stations, for each of the divided bands with respect to each of the plural gateway stations; and generates a divided transmission signal by adding or subtracting, for the transmission signal to be transmitted to the gateway station, a transmission signal to be transmitted to another gateway station that is multiplied by the weight corresponding to the other gateway station, for each of the divided bands with respect to each of the plural gateway stations, and generates a transmission signal by synthesizing the divided transmission signals of the plural divided bands.

3. A system comprising an aerial-staying type communication relay apparatus including a relay communication station that relays a radio communication of a terminal apparatus, comprising plural gateway stations that are time-synchronized with each other and transmit and receive relay signals different from each other on a same frequency in the feeder link to and from the relay communication station of the aerial-staying type communication relay apparatus, and wherein the relay communication station comprises a feeder-link communication section that transmits and receives relay signals different from each other on a same frequency in a feeder link to and from the plural gateway stations, and an interference suppression section that suppresses an interference between plural feeder links formed with the plural gateway stations, wherein the feeder-link communication section of the relay communication station transmits plural pilot signals having frequencies different from each other, to each of the plural gateway stations, in order to estimate plural propagation path responses between the gateway station and an antenna for feeder link of the communication relay apparatus in a transmission signal band of the feeder link, wherein each of the plural gateway stations receives the plural pilot signals for estimating the plural propagation path responses, the plural pilot signals being transmitted from the relay communication station, wherein any one gateway station of the plural gateway stations or a common apparatus common to each gateway station:

estimates the plural propagation path responses between the gateway station and the antenna for feeder link of the communication relay apparatus in the transmission signal band of the feeder link, based on reception results of the plural pilot signals;

calculates a weight for suppressing an interference signal that causes an interference by a transmission signal transmitted from the relay communication station to the gateway station and received by another gateway station, based on the estimation results of the plural propagation path responses, with respect to each of the plural gateway station; and transmits calculation results of the weight to the relay communication station, wherein the feeder-link communication section of the relay communication station receives the calculation results of the plural weights transmitted from the any one gateway station or the common apparatus, and wherein the interference suppression section of the relay communication station adds or subtracts, for the transmission signal to be transmitted to the gateway station, a transmission signal to be transmitted to another gateway station that is multiplied by the weight corresponding to the other gateway station, with respect to each of the plural gateway station, wherein each of the plural gateway stations:

receives the plural pilot signals transmitted from the relay communication station, and separates each of the received plural pilot signals with a filter;

divides the transmission signal band of the feeder link into plural divided bands, and estimates a propagation path response between the gateway station and the antenna for feeder link of the communication relay apparatus in the transmission signal band of the feeder link for each of the plural divided bands, with a center frequency of each of the plural divided bands as an estimated frequency, based on the reception result of the pilot signal received from the relay communication station and separated; and transmits the estimation result of the propagation path response of each of the plural divided bands, to the relay communication station, wherein the feeder-link communication section of the relay communication station receives the estimation result of the propagation path response of each of the plural divided bands transmitted from each of the plural gateway stations, wherein the interference suppression section of the relay communication station:

calculates a weight for suppressing an interference signal that causes an interference by a transmission signal transmitted from the relay communication station to the gateway station and received by another gateway station, based on the propagation path response of each of the plural divided bands received from each of the plural gateway stations, for each of the divided bands with respect to each of the plural gateway stations; and generates a divided transmission signal by adding or subtracting, for the transmission signal to be transmitted to the gateway station, a transmission signal to be transmitted to another gateway station that is multiplied by the weight corresponding to the other gateway station, for each of the divided bands with respect to each of the plural gateway stations, and generates a transmission signal by synthesizing the divided transmission signals of the plural divided bands.

4. The system according to claim 1,
wherein the plural pilot signals are distributed and transmitted in plural guard bands located on both sides of the transmission signal band of the feeder link.

5. The system according to claim 1,
wherein the plural gateway stations or the interference suppression section of the relay communication station estimates the plural propagation path responses and calculates the plural weights, at the center frequency of the transmission signal band of the feeder link or a frequency around the center frequency.

6. The system according to claim 2,
wherein the plural pilot signals are distributed and transmitted in plural guard bands located on both sides of the transmission signal band of the feeder link.

7. The system according to claim 3,
wherein the plural pilot signals are distributed and transmitted in plural guard bands located on both sides of the transmission signal band of the feeder link.

8. The system according to claim 2,
wherein the plural gateway stations or the interference suppression section of the relay communication station estimates the plural propagation path responses and calculates the plural weights, at the center frequency of the transmission signal band of the feeder link or a frequency around the center frequency.

9. The system according to claim 3,
wherein the plural gateway stations or the interference suppression section of the relay communication station estimates the plural propagation path responses and calculates the plural weights, at the center frequency of the transmission signal band of the feeder link or a frequency around the center frequency.

* * * * *